(12) United States Patent
Smith et al.

(10) Patent No.: US 8,612,268 B2
(45) Date of Patent: Dec. 17, 2013

(54) SYSTEMS AND METHODS FOR MANAGING AN EVENT

(75) Inventors: Alison Lee Smith, Toronto (CA); Deborah Bella Zinman, Toronto (CA)

(73) Assignee: Echoage Inc., Toronto (CA)

( * ) Notice: Subject to any disclaimer, the term of this patent is extended or adjusted under 35 U.S.C. 154(b) by 469 days.

(21) Appl. No.: 12/266,048

(22) Filed: Nov. 6, 2008

(65) Prior Publication Data
US 2010/0114613 A1     May 6, 2010

(51) Int. Cl.
   *G06Q 10/00*     (2012.01)
(52) U.S. Cl.
   USPC .............................................. 705/5
(58) Field of Classification Search
   USPC .............................................. 705/5
   See application file for complete search history.

(56) References Cited

U.S. PATENT DOCUMENTS

| | | | |
|---|---|---|---|
| 2004/0128183 A1* | 7/2004 | Challey et al. | 705/10 |
| 2004/0167987 A1* | 8/2004 | Reese et al. | 709/238 |
| 2005/0033615 A1* | 2/2005 | Nguyen et al. | 705/5 |
| 2006/0074919 A1* | 4/2006 | Grover et al. | 707/10 |
| 2006/0294012 A1* | 12/2006 | Brattesani et al. | 705/52 |
| 2007/0036287 A1* | 2/2007 | Campbell | 379/67.1 |
| 2007/0112581 A1* | 5/2007 | Smith et al. | 705/1 |
| 2007/0208627 A1* | 9/2007 | Abadi | 705/26 |
| 2007/0250381 A1* | 10/2007 | Denk et al. | 705/14 |

\* cited by examiner

*Primary Examiner* — John Hayes
*Assistant Examiner* — Allen J Jung
(74) *Attorney, Agent, or Firm* — Bereskin & Parr LLP/S.E.N.C.R.L., s.r.l.

(57) ABSTRACT

The present invention relates to a method, a system and a physical computer readable medium for distributing payment to a host of an event and a second entity by receiving payment confirmations indicating payment amounts from guests for the event. The payment amounts for all received confirmations are aggregated. Using the aggregated payment amounts, a first payment total and a second payment total are calculated and distributed to the host of the event and a second entity, respectively. The present invention further relates to a method for managing an event. The method involves registering a host, registering an event, and registering guests for the event. In response to receiving notification from at least one guest, status information for the event is provided to the host. The status information includes: the event, the guests, and at least some information based on the received notification.

26 Claims, 22 Drawing Sheets

# SYSTEMS AND METHODS FOR MANAGING AN EVENT

FIELD

Embodiments described herein relate generally to systems and methods for managing an event and, in particular, to systems and methods for managing an event and for distributing payment to a host of the event and a second entity.

INTRODUCTION

Known systems and methods for managing an event allow a host of the event to send out electronic invitations to potential guests of the event. Some of these known systems and methods provide a website where a guest can confirm that they wish to attend the event. Guests may be required to submit an electronic payment at the website to purchase a ticket in order to attend the event. However, these known systems and methods do not pool payments received from guests and do not distribute portions of the received payments to other entities.

Other known systems and methods allow people to submit an electronic payment at the website to participate in a sports pool, for example. A sports pool generally allows all participants to bet on one or more sport games, sport teams or players. All received payments are pooled and a winner of the sports pool receives the pooled payments or a portion thereof. However, the pooled payments are not distributed to a host of an event or other entities.

Further known systems and methods for managing events may generate excessive waste. For example, for an event such as a child's birthday party typically all guests will bring a wrapped gift to the birthday party for the child. The trend of each guest bringing a wrapped gift may promote consumerism, may generate a large amount of waste and may be excessive as the child may already have more than enough material goods. Regardless, guests still generally feel obligated to give something to the child who is having the birthday party as a token of acknowledgment and celebration.

SUMMARY

The embodiments described herein, provide in one aspect a method for distributing payment to a host of an event and a second entity. The method comprises: receiving confirmation from a plurality of guests for the event, wherein each confirmation comprises a payment amount; aggregating the payment amounts for all received confirmations; calculating a first payment total and a second payment total using the aggregated payment amounts; distributing the first payment total to a host of the event; and distributing the second payment total to a second entity.

The embodiments described herein, provide in another aspect a system for distributing payment to a host of an event and a second entity. The system comprises; a guest module adapted to receive confirmation from a plurality of guests for the event, wherein each confirmation comprises a payment amount; and a payment module adapted to aggregate the payment amounts of all received confirmations and calculate a first payment total and a second payment total using the aggregated payment amounts, and further adapted to distribute a first payment total to a host of the event and a second payment total to a second entity.

The embodiments described herein, provide in a further aspect a method for managing an event. The method comprises registering a host of the event by receiving a plurality of host attributes; registering the event by receiving a plurality of event attributes; registering a plurality of guests by receiving a plurality of guest identifiers, each guest identifier being associated with one of the plurality of guests for the event; receiving notification from at least one guest, wherein each notification comprises a plurality of guest attributes; and providing status information for the event to the host, wherein the status information comprises: the event, the plurality of guests, and at least a portion of the plurality of guest attributes.

The embodiments described herein, provide in a further aspect a physical computer readable medium including computer executable instructions which, when executed on a computing device, cause the computing device to perform the steps of: receiving confirmation from a plurality of guests for the event, wherein each confirmation comprises a payment amount; aggregating the payment amounts for all received confirmations; calculating a first payment total and a second payment total using the aggregated payment amounts; distributing the first payment total to a host of the event; and distributing the second payment total to a second entity.

DRAWINGS

For a better understanding of the embodiments described herein and to show more clearly how they may be carried into effect, reference will now be made, by way of example only, to the accompanying drawings which show at least one exemplary embodiment, and in which:

FIG. 12 shows a sample screen shot of an event webpage having a registration form 510 used by event system 30 to receive host attributes;

FIG. 15 shows sample screen shots of an event webpage having a guest details form 550 used by event system 30 to receive a notification containing guest attributes;

Figure 16:
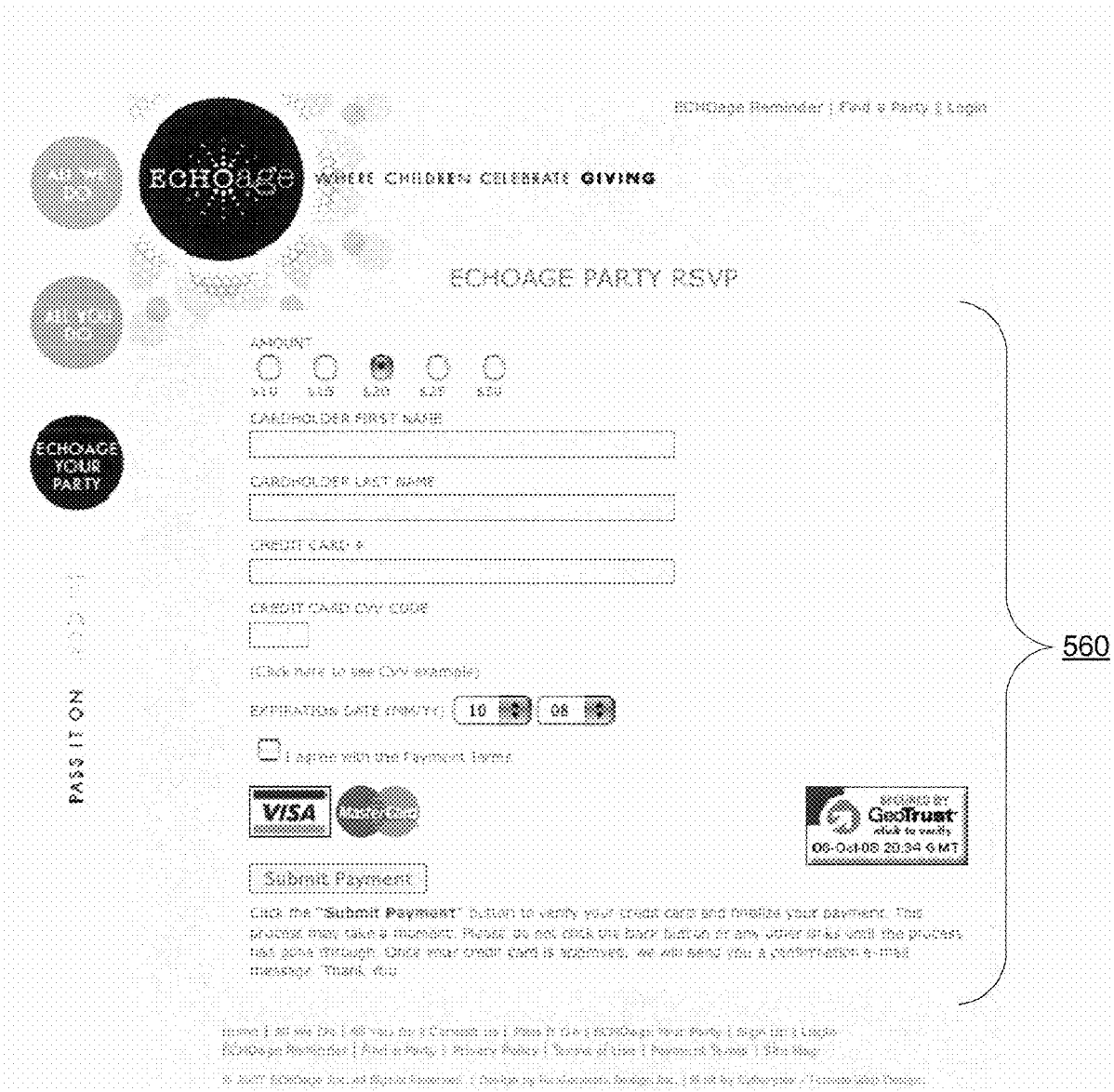
Figure 17:
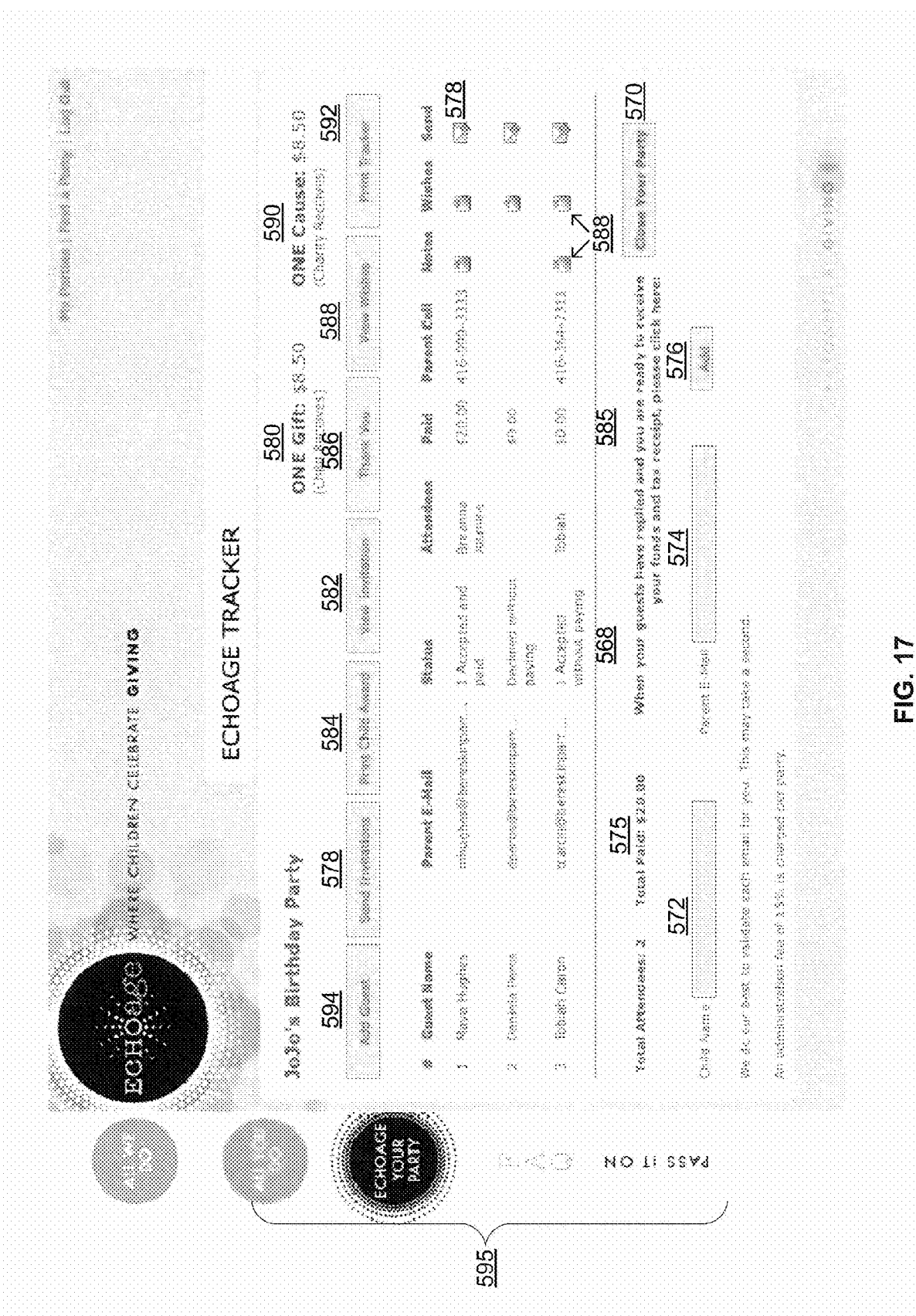
Figure 18:
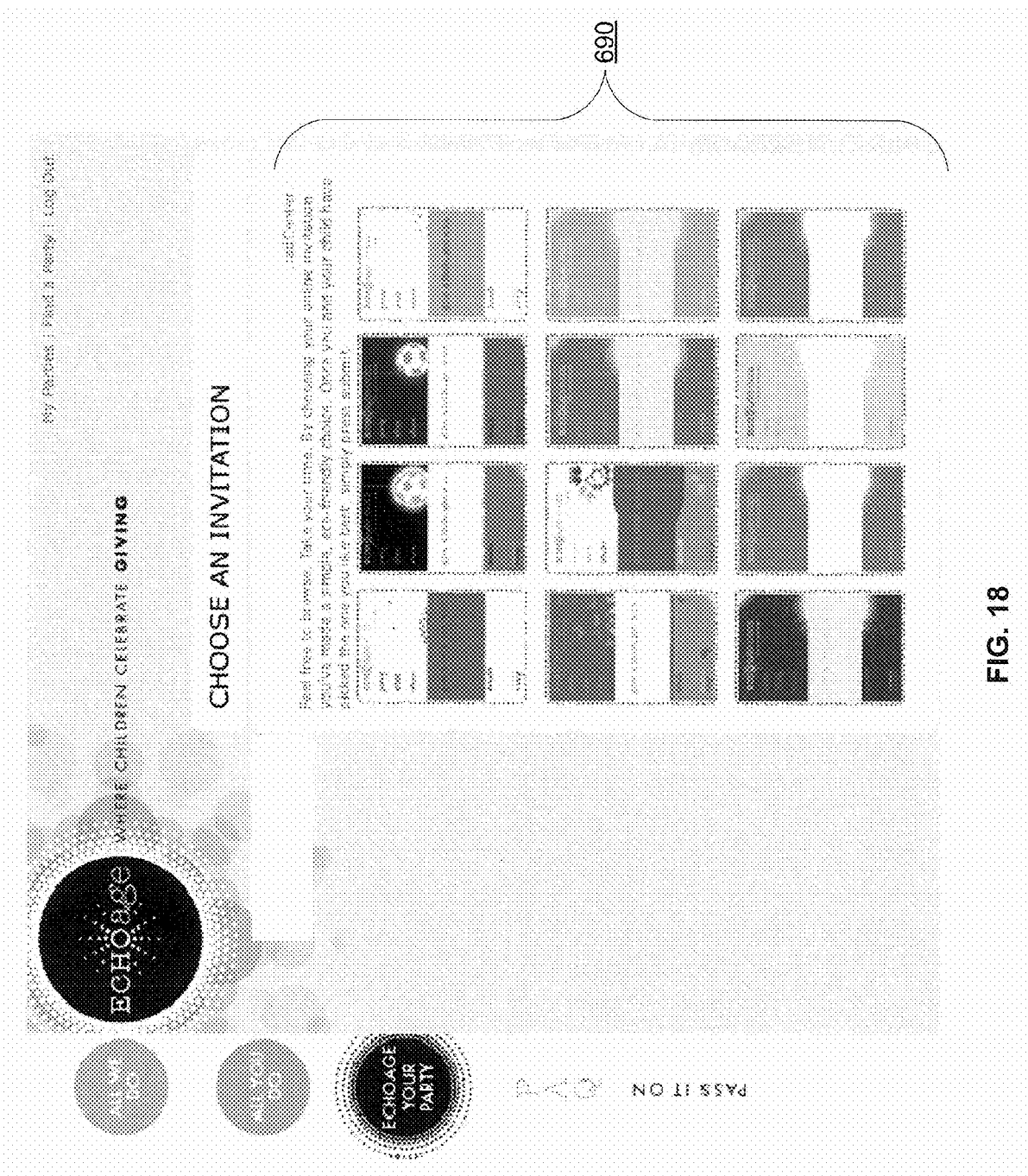
Figure 19:
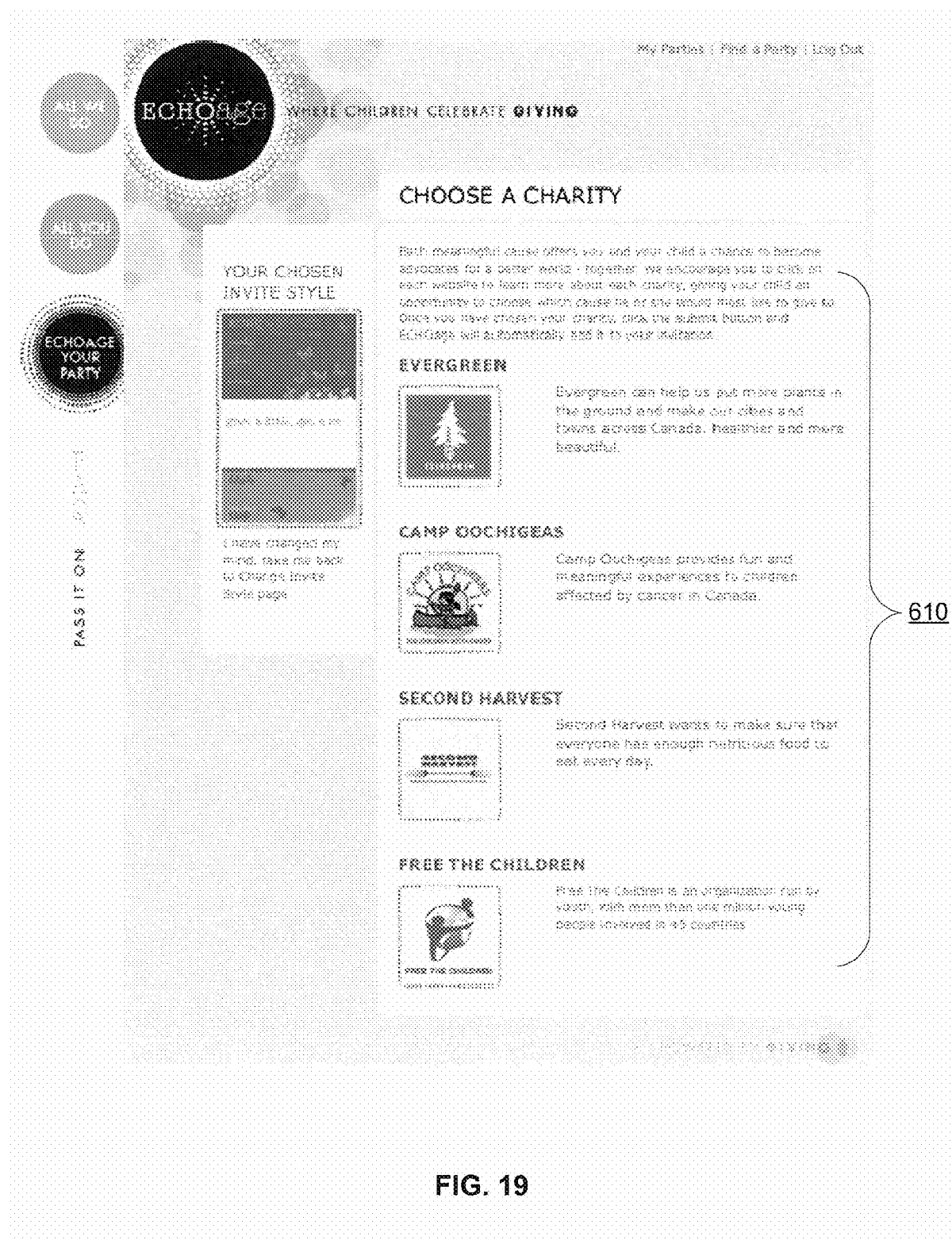
Figure 21:
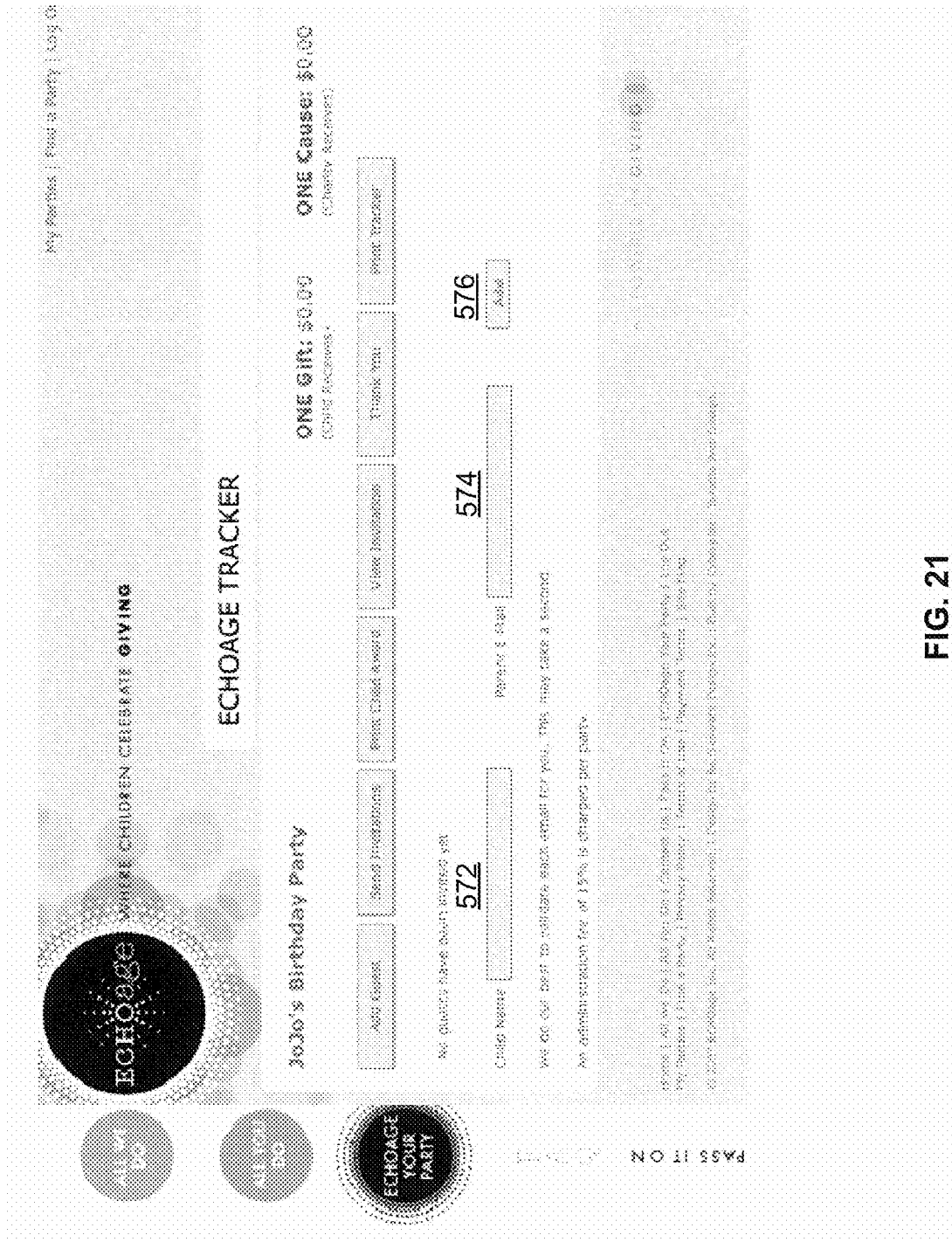
Figure 22:
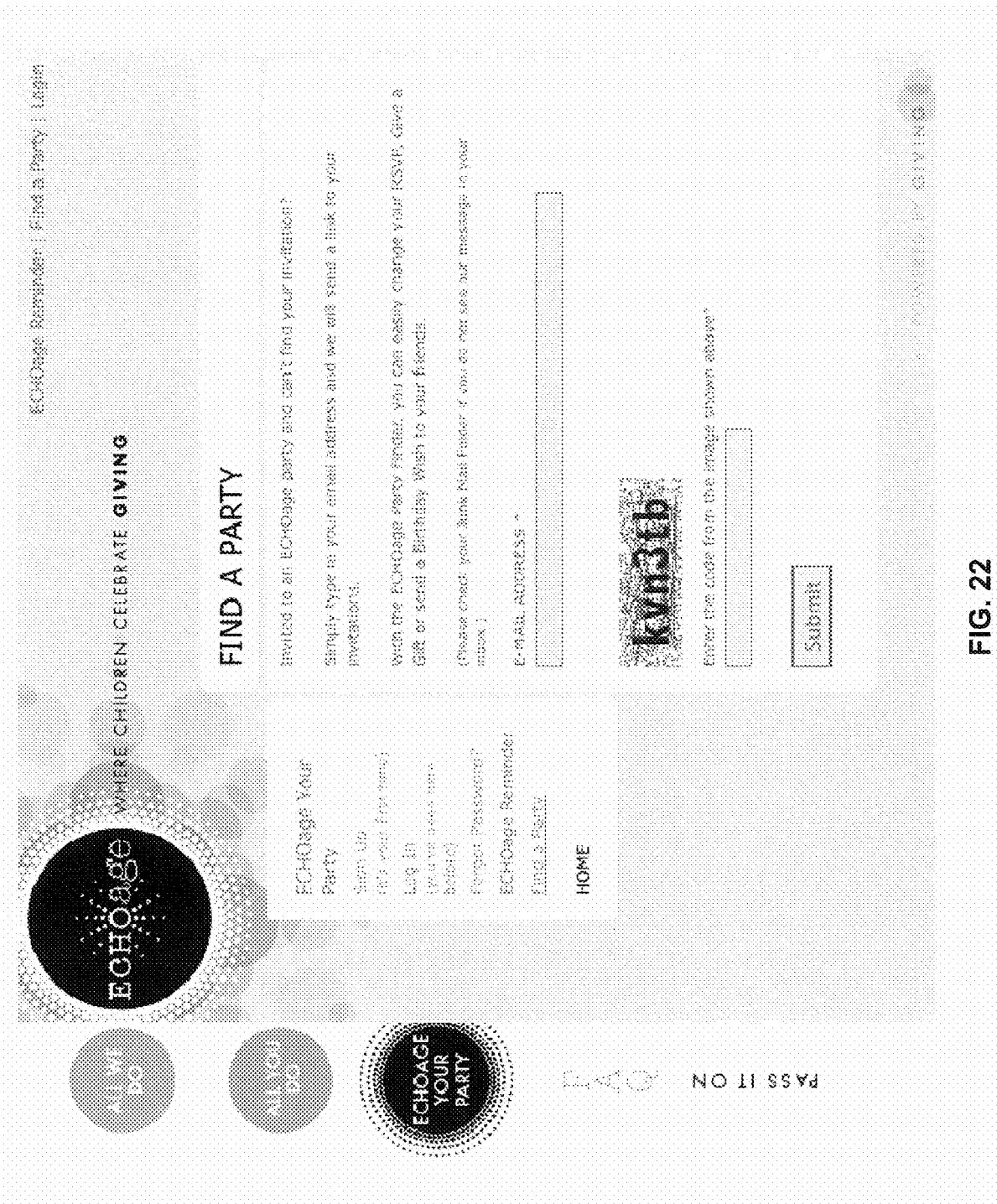
Figure 23:
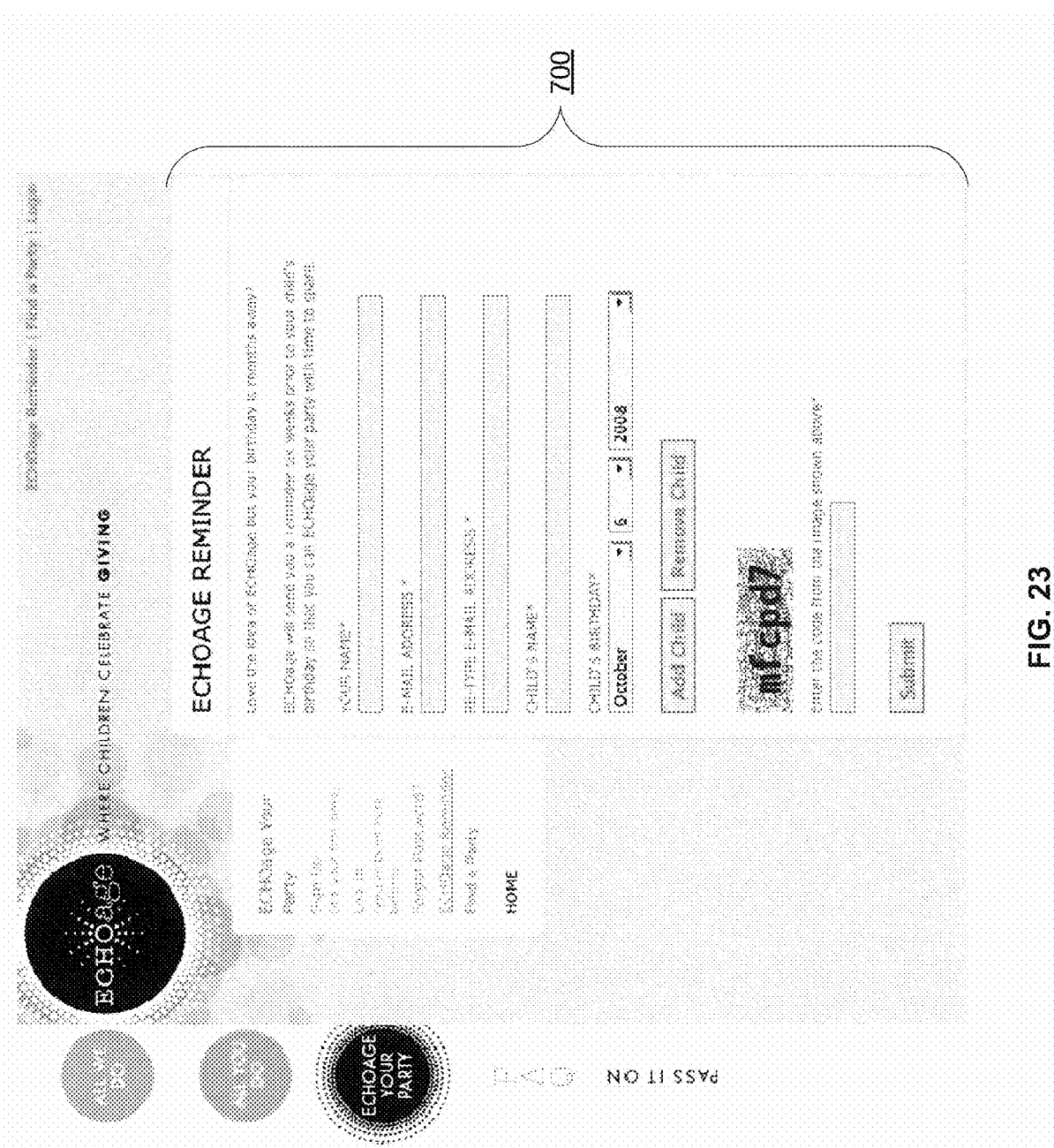

FIG. 16 shows a sample screen shot of an event webpage having a payment details form 560 used by event system 30 and/or payment gateway 26 to receive a confirmation containing a payment confirmation;

FIG. 17 shows a sample screen shot of an event webpage providing the host with an option to close to the event;

FIG. 18 shows a sample screen shot of an event webpage having a listing of invitation formats 600 for selection by the host;

FIG. 19 shows a sample screen shot of an event webpage having a listing of charities 610 for selection by host;

Figure 20:
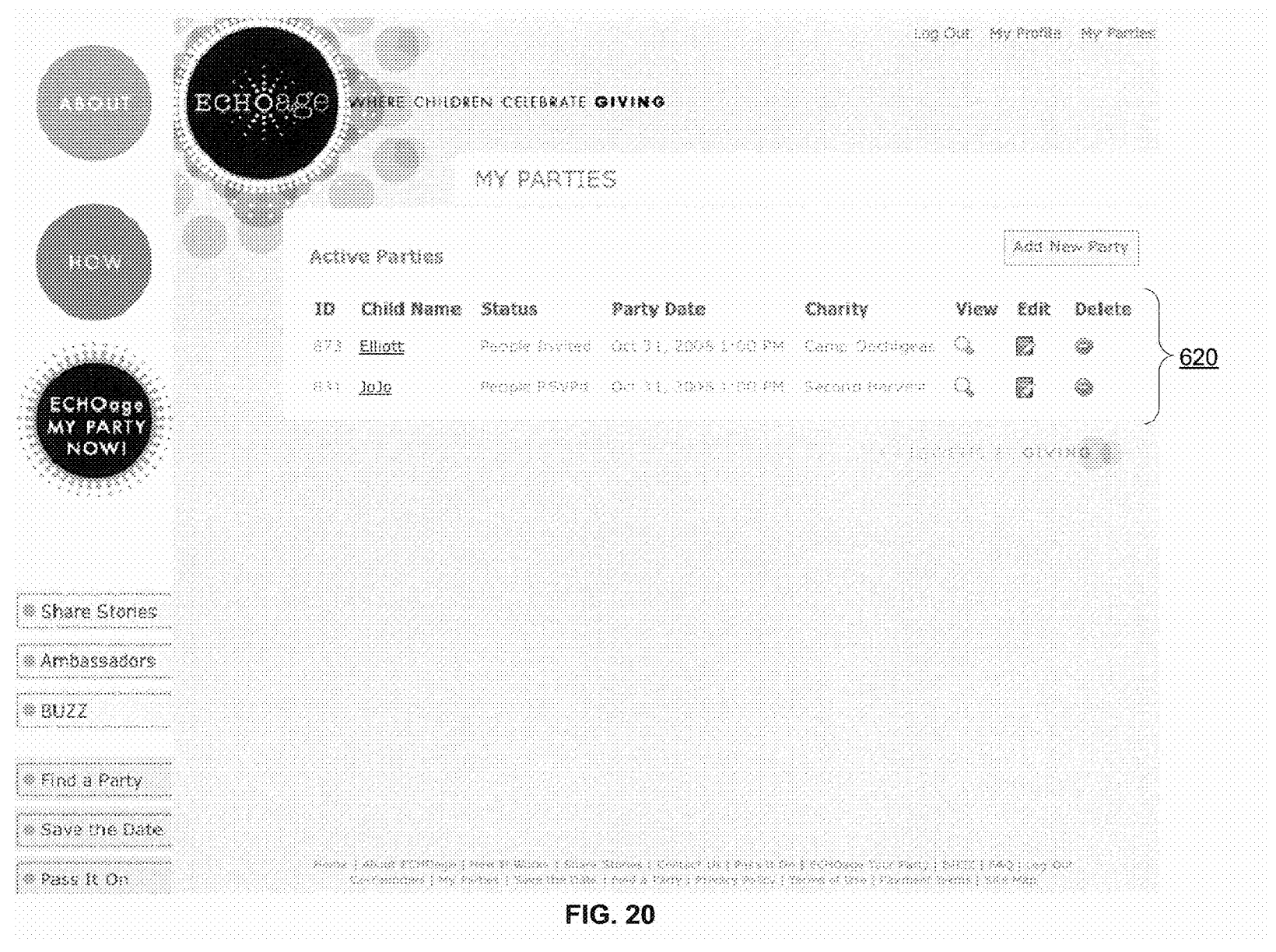

FIG. 20 shows a sample screen shot of an event webpage having a listing of all events 620 for selection by host;

FIG. 21 shows a sample screen shot of an interface for an event tracker;

FIG. 22 shows a sample screen shot of an event webpage for use by event system 30 to receive event request; and FIG. 23 shows a sample screen shot of a subscriber form 700 used by event system 30 to receive subscriber identifiers.

DESCRIPTION OF VARIOUS EMBODIMENTS

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. For example, these embodiments may be implemented in computer programs executing on programmable computers each comprising at least one processor, a data storage system (including volatile and non-volatile memory and/or storage elements), at least one input device, and at least one output device. For example and without limitation, the programmable computers may be a mainframe computer, server, personal computer, laptop, personal data assistant, or cellular telephone. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the method steps described herein. The inventive system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Figure 1:
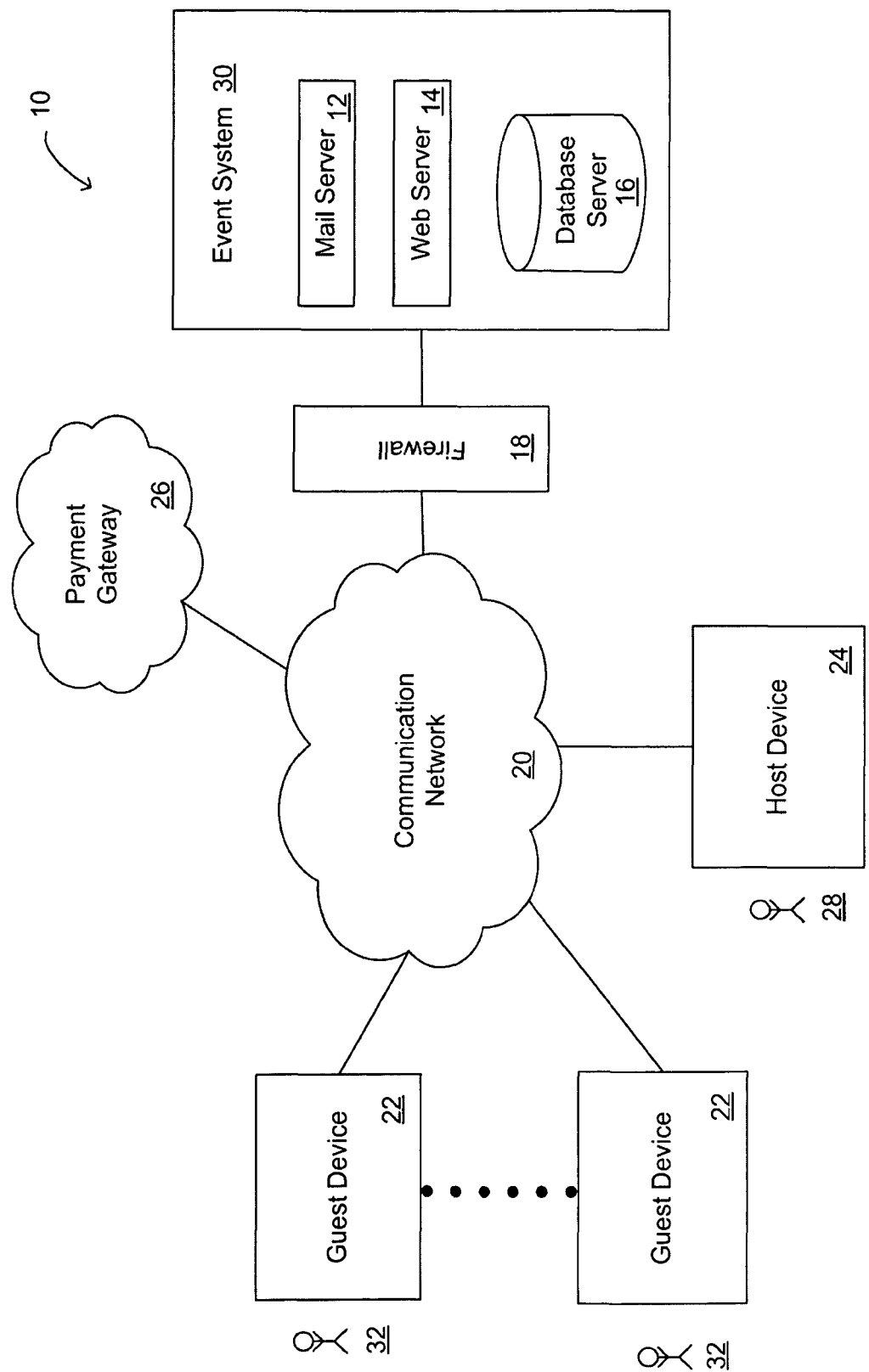
FIG. 1 is a block diagram illustrating the components of a system in accordance with at least one embodiment of the present invention.

Reference is now made to FIG. 1, which shows a block diagram illustrating the components of a system 10 in accordance with at least one embodiment of the present invention. The system 10 includes an event system 30, for managing an event. Event system 30 is connected via a communication network 20 to a host device 24 used by a host 28 of the event and to guest devices 22 used by guests 32 of the event. Event system 30 may optionally use a firewall 18 to securely connect to communication network 20.

In some embodiments of the present invention, the event server 30 receives confirmation from guests 32 of the event via guest devices 22. It will be understood by those skilled in the art that guests 32 may be actual guests, invitees, attendees, friends, client, customer, and the like. Each received confirmation includes a payment confirmation indicating a payment amount.

System 10 may optionally include a payment gateway 26 to receive electronic payments from the guests 32 via guest devices 22. A confirmation may include the electronic payment received the from the guest 32. The event server 30 aggregates the payment amounts for all received confirmations and divides the aggregated payment amounts into a first payment total and a second payment total. The event server 30 distributes the first payment total to the host 28 of the event and the second payment total to a second entity (not shown). Event system 30 may use payment gateway 26 to distribute payment to the host 28 and/or the second entity.

The event system 30 may register the host 28 of the event by receiving host attributes from the host device 24. Event system 30 may register the event by receiving event attributes from the host device 24.

The event system 30 manages the event using an event tracker (not shown). The event system 30 registers guests 32 of the event by receiving guest identifiers from e.g., the host device 24. The event system 30 receives notification from at least one guest 32 via guest device 22 and each received notification includes guest attributes. The event system 30 provides status information for the event to the host 28 via host device 24, where the status information indicates the event, the identity of the guests 32, and at least some of the received guest attributes.

Event system 30 is preferably a server system comprising one or more servers with computing processing abilities and memory such as database(s) or file system(s). For example, event system 30 may include mail server 12, web server 14 and database server 16. Although only one event system 30 is shown for clarity, those skilled in the art will understand that there may be multiple event systems 30 distributed over a wide geographic area and connected via e.g. communication network 20.

In an exemplary embodiment, the event system 30 may be implemented using a L.A.M.P. software environment, which refers to the LINUX™ operating system, the APACHE™ HTTP web server, the MySQL™ database management system, and the PHP™ computer scripting language. For example, the database server 16 may be implemented using the CentOS™ operating system and the MySQL™ 5.1 database management system, the web server 14 may be implemented using the CentOS™ operating system and an APACHE™ HTTP web server, and the mail server 12 may be implemented using the Windows 2003™ operating system and a Merak Mail™ server.

Communication network 20 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Communication network 20 is any network capable of interfacing with, and enabling communication between, guest devices 22, host device 24, and event system 30.

Guest devices 22 and host device 24 may be any networked computing device including a processor and memory, such as a personal computer, workstation, server, portable computer, mobile phone, personal digital assistant, laptop, smart phone, satellite phone, WAP phone, or a combination of these. Although for clarity only one host device 24 is illustrated in FIG. 1, there may be multiple host devices 24 used by multiple hosts 28 to access event system 30 over communication network 20. Guest devices 22 and the host device 24 may include a software application, application plug-in (e.g. a widget), instant messaging application, mobile device application, e-mail application, online telephony application, java application, web page, or web object (e.g. a widget) residing or rendered on host device 24 and guest devices 22 in order to access the functionality of event system 30 (FIG. 3) using communication network 20. Host device 24 and guest devices 22 will be described in more detail herein in relation to FIG. 2.

Firewall 18 is a device, set of devices or software that inspects network traffic passing through it, and denies or permits passage based on a set of rules and other criteria. Firewall 18 may be adapted to permit, deny, encrypt, decrypt, or proxy all computer traffic between communication network 20 and event system 30 based upon a set of rules and other criteria. For example, firewall 18 may be a network layer firewall, an application layer firewall, a proxy server, or a firewall with network address translation functionality. In an exemplary embodiment, Firewall 18 may be implemented using a Cisco™ PIX (Private Internet eXchange) IP firewall and network address translation appliance. Although only one firewall 18 is shown in FIG. 1, there may be other firewalls 18 between other components of system 10 and communication network 20 to enable secure communication.

Payment gateway 26 is a server system that provides an e-commerce application service that authorizes payments made using a credit card, a debit card, an electronic payment system, a smart card, a mobile phone and the like. For example, payment gateway 26 may be implemented using the PayPal™ payment platform. Generally, a payment gateway 26 is the online equivalent of a physical point of sale terminal located in retail outlets. Payment gateway 26 may encrypt sensitive information, such as credit card numbers, to ensure that information passes securely over communication network 20. There may be a firewall 18 between payment gateway 26 and communication network. Payment gateway may be integral to and may form part of event system 30, even though they are illustrated in FIG. 1 as separate components.

Figure 2:
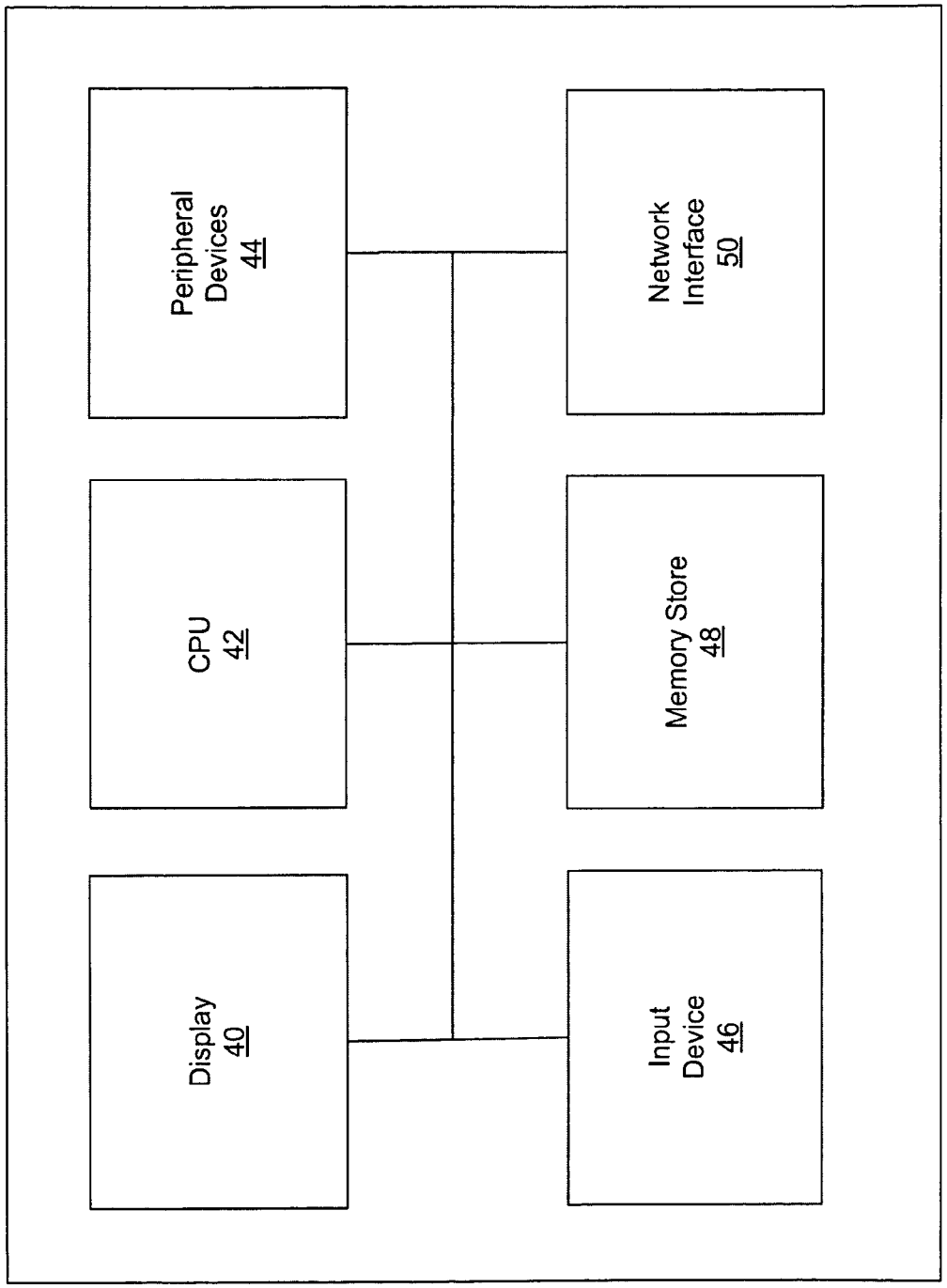
FIG. 2 is a block diagram illustrating the components of a guest device and a host device in accordance with at least one embodiment of the present invention.

Reference is now made to FIG. 2, which shows a block diagram illustrating in further detail the components associated with a guest device 22 and/or a host device 24 in accordance with at least one embodiment of the present invention.

In an exemplary embodiment, the guest device 22 and/or host device 24 have associated with them a display 40, an input device 46, a memory store 48, a central processing unit 42, a network interface 50, and one or more optional peripheral devices 44. The display 40 is a monitor type device that is used to display information. The input devices 46 may be any device that allows for input, examples of which may include, but are not limited to, keyboards, microphones, speakers, and pointing devices. The memory store 48 is a permanent storage associated with the device. In one embodiment, the memory store 36 may store an instance of an event application 80 (FIG. 3) or a portion thereof. However, in an exemplary embodiment the event system 30 is accessed through the communication network 20. The central processing unit 42 is used to execute instructions for operation of the guest device 22 and/or the host device 24. The network interface 50 may be a wired and/or wireless network interface that allows the device to connect to the communication network 20. The peripheral devices 44 may include but are not limited to, devices such as printers, antenna, transceivers and scanners.

Figure 3:
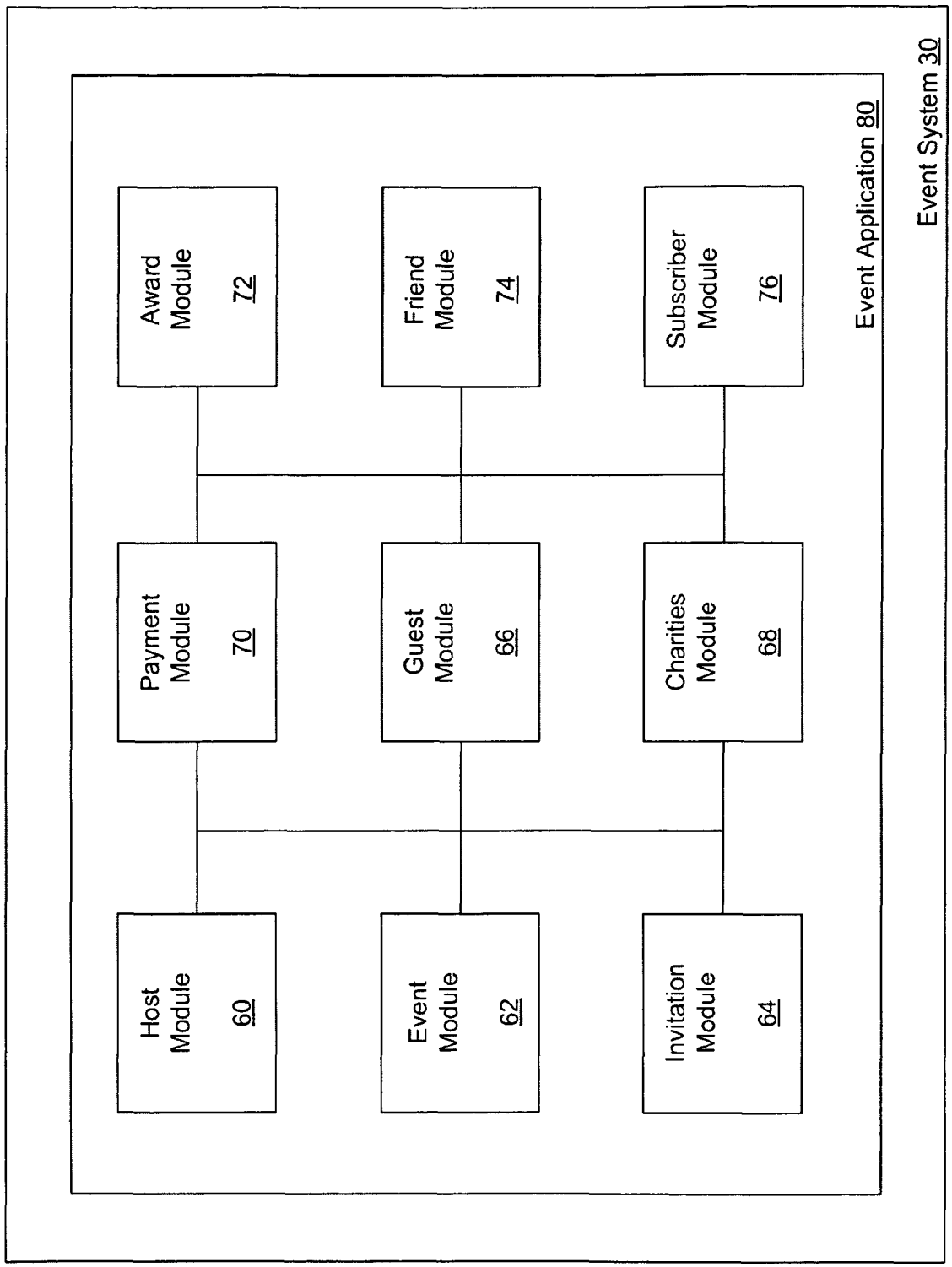
FIG. 3 is a block diagram illustrating the components of a server system and an event application in accordance with at least one embodiment of the present invention.

Reference is now made to FIG. 3, which shows a block diagram illustrating in further detail the components of an event system 30 in accordance with at least one embodiment of the present invention. The event system 30 has associated with it an event application 80.

The event application 80, in an exemplary embodiment, is a hardware or software application that includes a host module 60, an event module 62, an invitation module 64, a guest module 66, a charities module 68, and a payment module 70. In some embodiments of the present invention, the event application 80 may further include an award module 72, a friend module 74 and a subscriber module 76. The event system 30 also has resident upon it, one or more data storages, such as database server 16 (FIG. 1), that are used for the storage of data associated with the event system 30 and for implementing the modules of event application 80.

The host module 60 registers the host 28 of the event by receiving host attributes. The host module 60 creates a host record that contains the received host attributes and stores the host record in the database server 16. Host attributes may include an email address for the host 28, a username, a first name, a last name, an address, and a password.

The event module 62 manages the event and registers the event by receiving event attributes. The event module 62 creates an event record that contains the received event attributes and stores the event record in database server 16. In the database server 16 the event record is linked to the host record for the host of the event. In some embodiments, event module may register more than one event associated with the same host 28, or a different host 28. Event attributes may include the host's 28 name, the host's 28 child's name, the host's child's age, the event date, the event start time, the event end time, location, food selections, dress code, transportation, an address, and any special instructions for the event.

The invitation module 64 provides a listing of electronic invitation formats, where each electronic invitation format is selectable by the host. The invitation module 64 may receive at least one selected electronic invitation format for use in creating invitations. The invitations may be electronic or printed on a physical substrate, for example. The invitation module 64 may receive a selected invitation format specific to the event, or the guests 32 of the event. The invitation module 64 links the at least one selected invitation format to the event record stored in the database server 16. The invitation module 64 may link more than one selected invitation format to the same event record, and may link that same selected invitation format to more than one event record stored in database server 16.

Using the at least one selected invitation format, the invitation module 64 creates invitations (e.g., electronic) to be sent to the guests by querying the events module 62 for the event record and by querying the guest module 62 for all guest records linked to the event record. The invitation module 64 may send invitations for the event to each guest for the event. If the invitation is electronic, it may contain a URL to an RSVP webpage for receiving the confirmation.

The guest module 66 registers guests 32 for the event by receiving guest identifiers. Each guest identifier is associated with a guest 32 for the event. The guest identifier may be the guest's email address or the guest's name. The guest module 66 creates a guest record that contains the received guest identifier and stores the guest record in the database server 16. In the database server 16, the guest record is linked to the event record.

The guest module 66 may receive confirmation from guests 32 for the event. Each confirmation includes a payment confirmation indicating a payment amount. The guest module 66 may receive payment confirmations from guest devices 22 or payment gateway 26, for example. The guest module stores the confirmation and the payment amount in the database server 16. The confirmation may be an indication of accepting or declining the invitation to attend the event (accept/decline). In either case, the guest module 66 may receive a payment confirmation from the guest 32.

The guest module 66 may also receive a notification from guests 32 for the event that includes guest attributes. Possible guest attributes are: new, viewed, resent, accepted and paid, accepted without paying, declined, declined and paid. Other guest attributes may be: guest 32 name(s), guest 32 telephone number, a guest address, an event acceptance, an event refusal, number of guests attending, a guest allergy, a guest special need, a guest medical condition, an event wish, a payment request, and a payment amount (aggregated or individual).

In some embodiments of the present invention, the event application 80 includes an email validation module (not shown), which validates each email address received by the guest module 66. The functionality of the email validation module will be described in detail herein in relation to FIG. 10.

The charities module 68 provides a listing of second entities, each being selectable by the host 28 and/or guest 32. For example, the second entities may be charities. However, it will be understood by those skilled in the art that the second entities may be any other type of entity. Once selected by the host 28 and/or guest 32 using e.g., input device 46, the charities module 68 receives the selected second entity. The charities module 68 links the selected second entity to the event record and/or guest record stored in database server 16.

The payment module 70 aggregates the payment amounts of all received confirmations and retrieves the payment amounts from the database 16. The payment module 70 may first deduct an administration fee from the aggregated payment amounts. This administration fee may be a fixed fee or a percentage based fee, such as 15%, for example. The payment module 70 can divide the aggregated payment amounts in a variety of ways. The payment module 70 may divide the aggregated payment amounts into a first payment total and a second payment total. The payment module 70 distributes the first payment total to the host 28 of the event and a second payment total to a second entity, such as a charity organization.

As noted above, the payment module 70 may deduct an administration fee from the aggregated payment amounts prior to dividing the aggregated payment amounts into a first payment total and a second payment total. This solution allows an administrator of the event system 30 to recoup payment for transaction costs associated with the event system 30 and payment gateway 26. Such transaction costs may be financial institution fees, payment gateway fees, payment fees (e.g., credit card fees), distribution costs, and applicable taxes.

Sending the second payment amount to one or a small number of charities or other entities reduces the administration time required to arrange payment distribution details with each entity. The payment module 70 may also charge a fixed administration fee to the host 24 for each event registered by the host 24.

The payment module 70 may receive electronic payment directly from one or more of the guests 32, or the host 28, via e.g., payment gateway 26, cheque or other payment mechanisms.

The award module 72 may generate an award for the host 28 or one or more guest 32 and distributes the award to the host 28 or guest 32. The award module 72 may only generate an award for the guest 32 if the guest module 66 receives a payment confirmation from such guests. The award module may query the guest module 66, event module 62 or host module 60 for data to generate award(s).

The friend module 74 preferably receives friend identifiers from the host 28. The friend module 74 then provides a listing of the friend identifiers, where each friend identifier is selectable by the host. The guest module 66 and/or the friend module 74 receives at least one selected friend identifier as a guest identifier received when the guest module 66 registers the guests 32. This allows the host 28 to access a stored collection of friends that they can select as guests 32 for their event(s).

The subscriber module 76 receives a subscriber identifier and stores a subscriber record containing the subscriber identifier in database server 16. The subscriber identifier may be the subscriber's name, email address, event date, child's name, and child's birthday, for example. The subscriber module 76 receives an alert and sends an electronic notification to the subscriber using the subscriber identifier. The electronic notification notifies the subscriber to register an event so that the subscriber becomes the host 28. This allows the subscriber to "save the date" for an event and receive an electronic notification reminder for the event.

Figure 4:
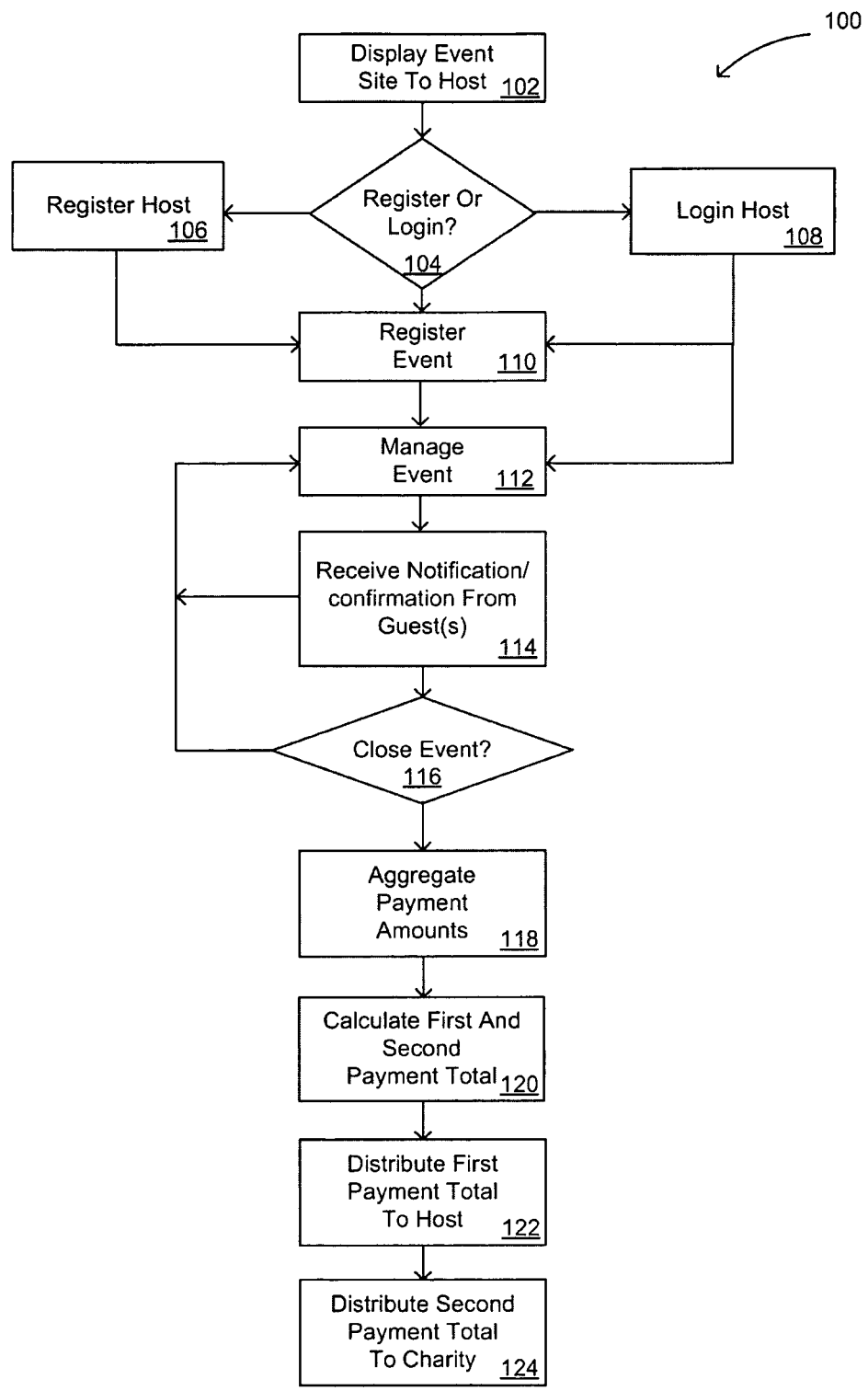
FIG. 4 is a flow diagram of a method for managing an event in accordance with at least one embodiment of the present invention.

Reference is now made to FIG. 4, which shows a flow diagram of a method 100 for managing an event in accordance with at least one embodiment of the present invention. Reference will also be made to FIGS. 15 to 23, which show sample screen shots of an event webpage in accordance with embodiments of the present invention.

As an example illustration of embodiments of the present invention, the managed event may be a child's birthday party, the host of the event may be the parent of the child, and the second entity may be a charity organization. The illustrated embodiment of the present invention provides a realistic solution for the parent and children to address the current trend in birthday party excess and to reduce the amount of waste generated at birthday parties.

As an example overview, the event system 30 may allow guests to be invited to the child's birthday party online where they RSVP and contribute a secure online gift of money. Monetary contributions may be limited to payment amounts ranging from $10.00 to $40.00, which may generally be an accessible amount for most guests. Received payment confirmations are pooled for the purchase of one special gift for the child and to support one meaningful charity organization. After all payment amounts are collected from guests and the total payment amount is calculated, a 15% administration fee may be deducted for administration of event system 30. Then, preferably one half of the funds are sent to the host by cheque or electronic payment for the purchase of one meaningful gift for the child. Preferably, the other half of the funds are sent to the charity organization that the child, the host, or the guest has chosen. The host may receive a tax receipt for the total amount that was donated to the charity organization on behalf of the birthday child.

By hosting a birthday party using the event system 30, the birthday child and host ask the guests to come and celebrate without bringing a wrapped and packaged present. The event system 30 may provide an online tool that the parent and child use together to implement an environmental and charitable program that is effective at rewarding children for their efforts. The child rallies his/her friends to help collectively take responsibility for the environment and for those living in situations of need. The inventors have created a balanced approach to addressing the issues via the event system 30. The solution may benefit: the environment, charities, children celebrating their birthday, children attending the parties, parents hosting the parties, parents of children attending the parties.

As further examples, event system 30 may be used to manage fundraising events (e.g. school fundraisers), weddings, showers, adult parties, corporate events, fundraising activities, graduations, bar mitvahs, special occasions, holiday events (e.g., Christmas, Hanukah), and the like.

Referring to FIG. 4, at step 102, event system 30 provides an instance of event application 80 to host device 24 by e.g., displaying an event webpage on display 40 using the web server 14.

Figure 11:
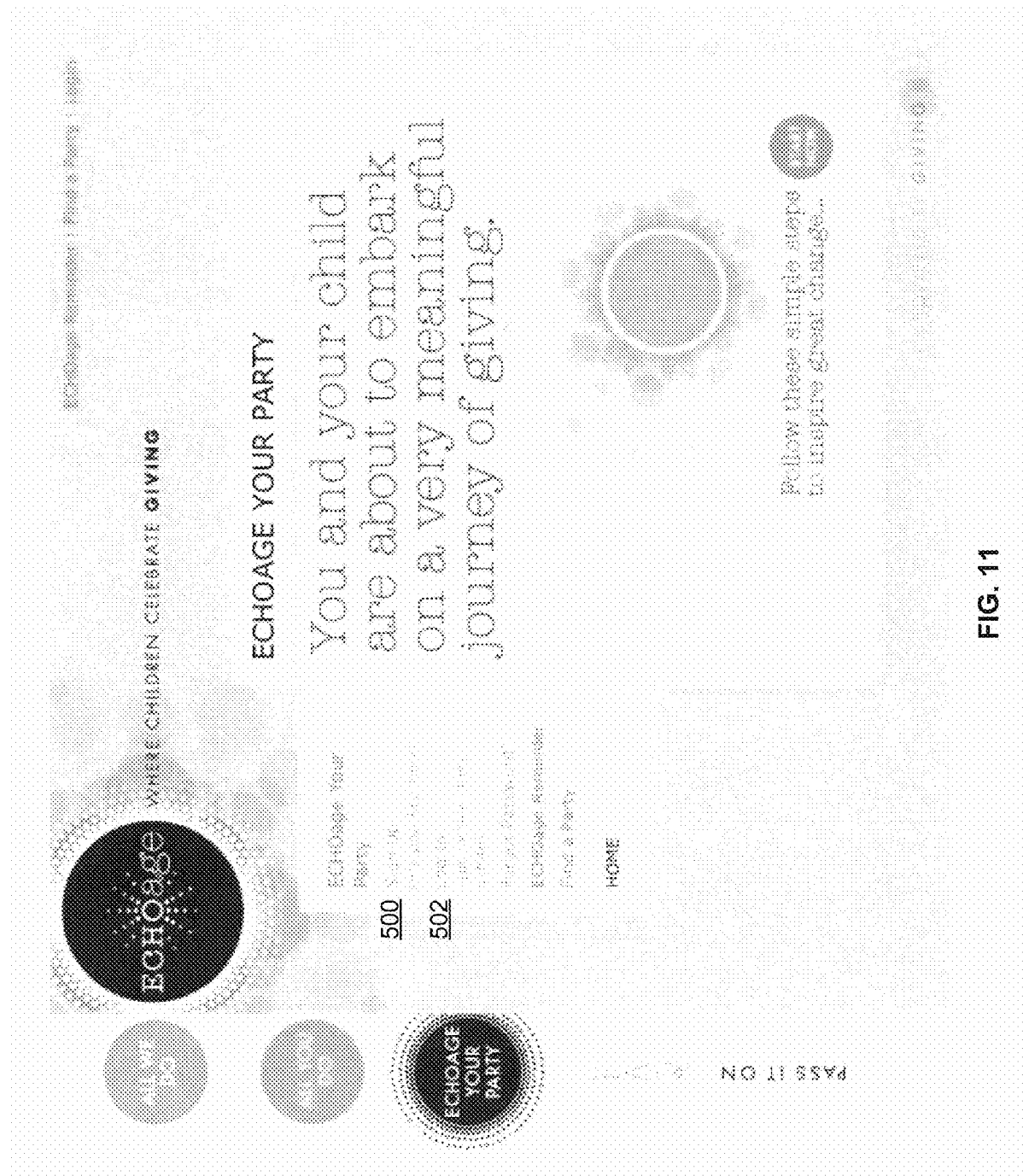
FIG. 11 shows a sample screen shot of an event webpage.

At decision diamond 104, event system 30 provides the host device 24 with an option to register for or login to event application 80 using e.g., input device 46. FIG. 11 shows a sample screen shot of an event webpage with an interface 500, 502 that provides the host with the option to register and to login.

Figure 12:
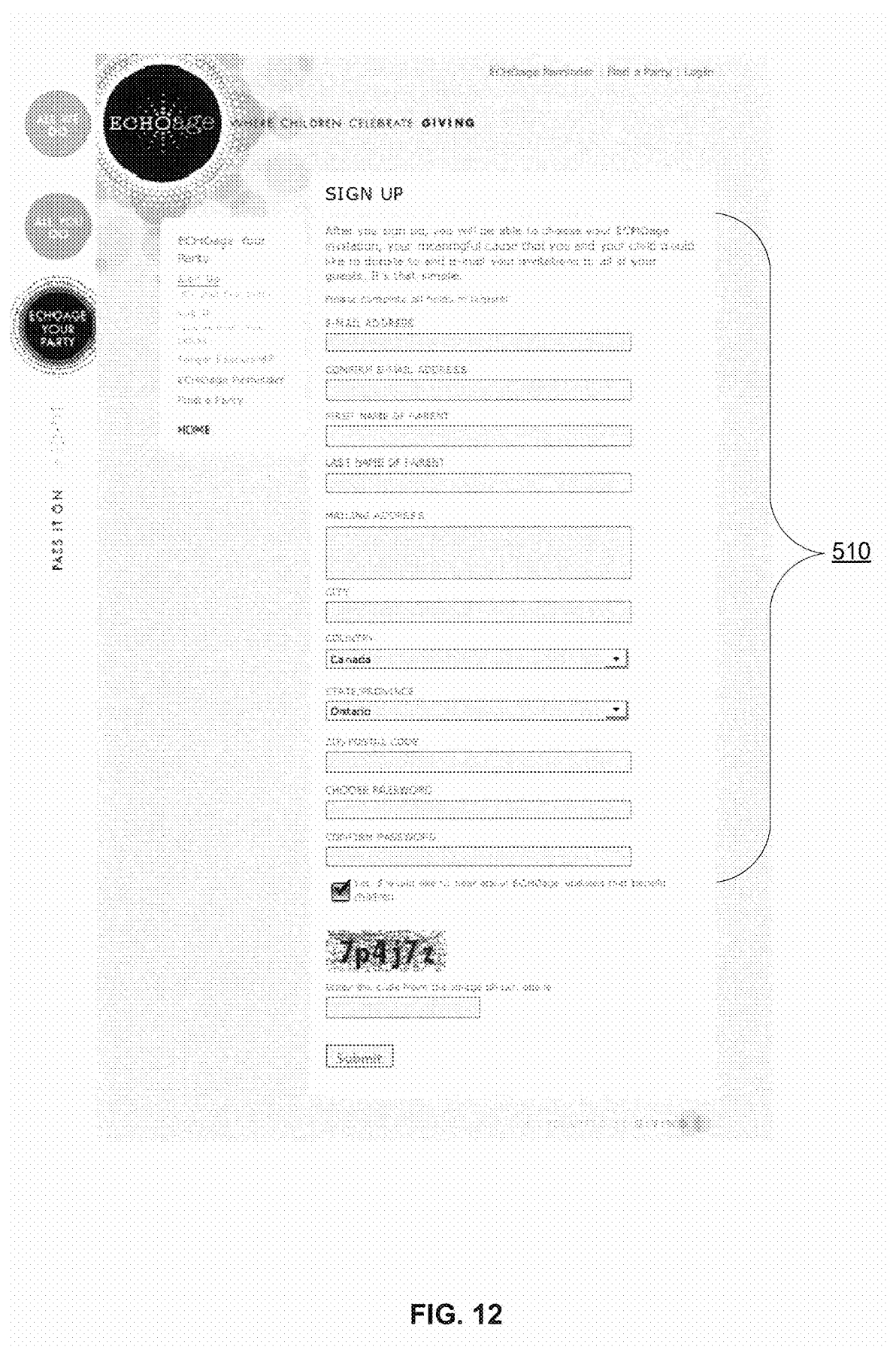

Referring again to FIG. 4, at step 106, the event system 30 receives a notification that host 24 has selected to register for event application 80. The event system 30 registers the host by receiving host attributes. FIG. 12 shows a sample screen shot of an event webpage having a registration form 510 used by event system 30 to receive host attributes such as an email address for the host 28, a username, a first name, a last name, an address, and a password, for example.

Figure 13:
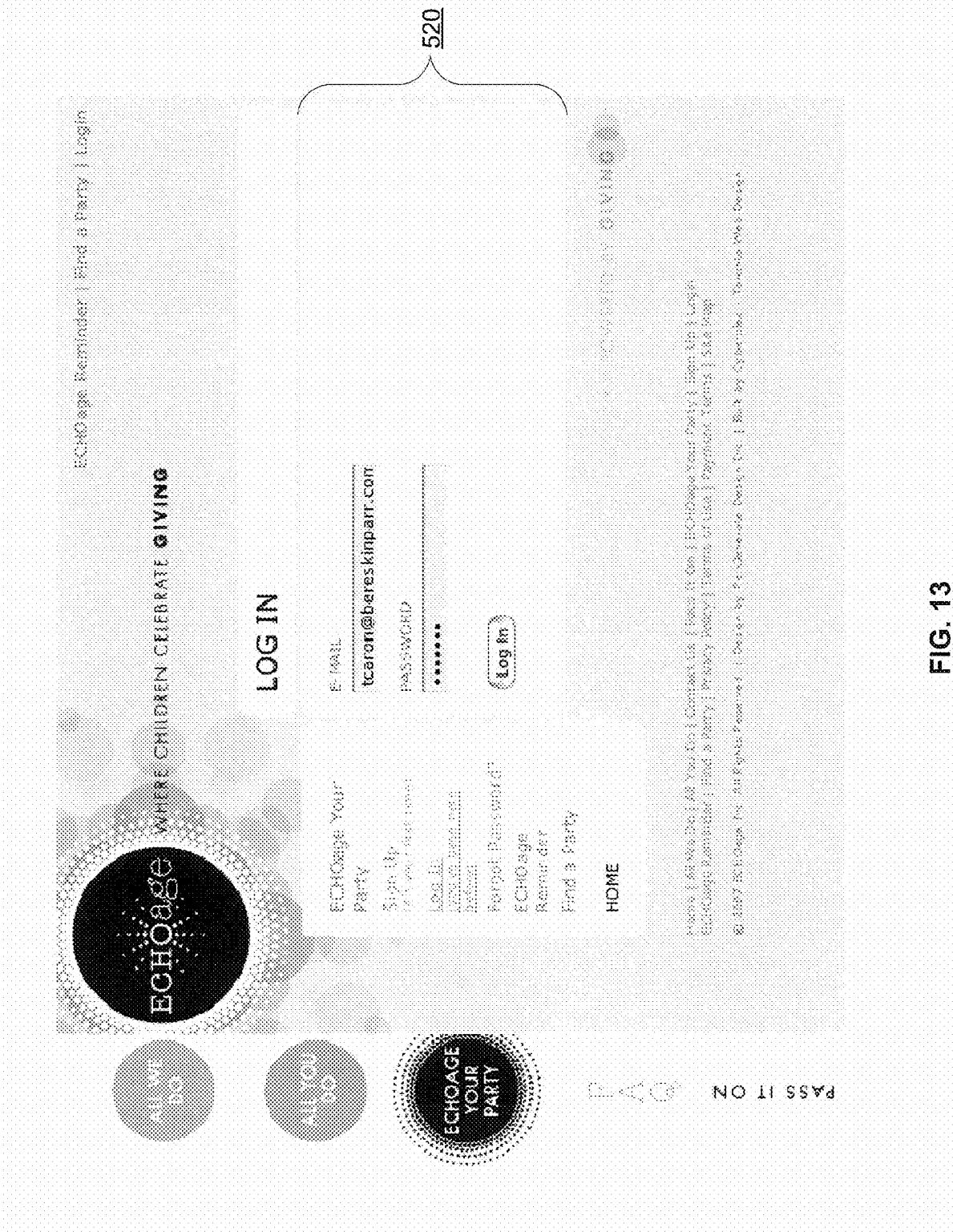
FIG. 13 shows a sample screen shot of an event webpage having a login form 520 used by event system 30 to receive login attributes.

At step 108, event system 30 receives a notification that the host 24 has selected login. The event system 30 receives login attributes from the host device 24, such as a username, email address, or password. FIG. 13 shows a sample screen shot of an event webpage having a login form 520 used by event system 30 to receive login attributes.

Figure 14:
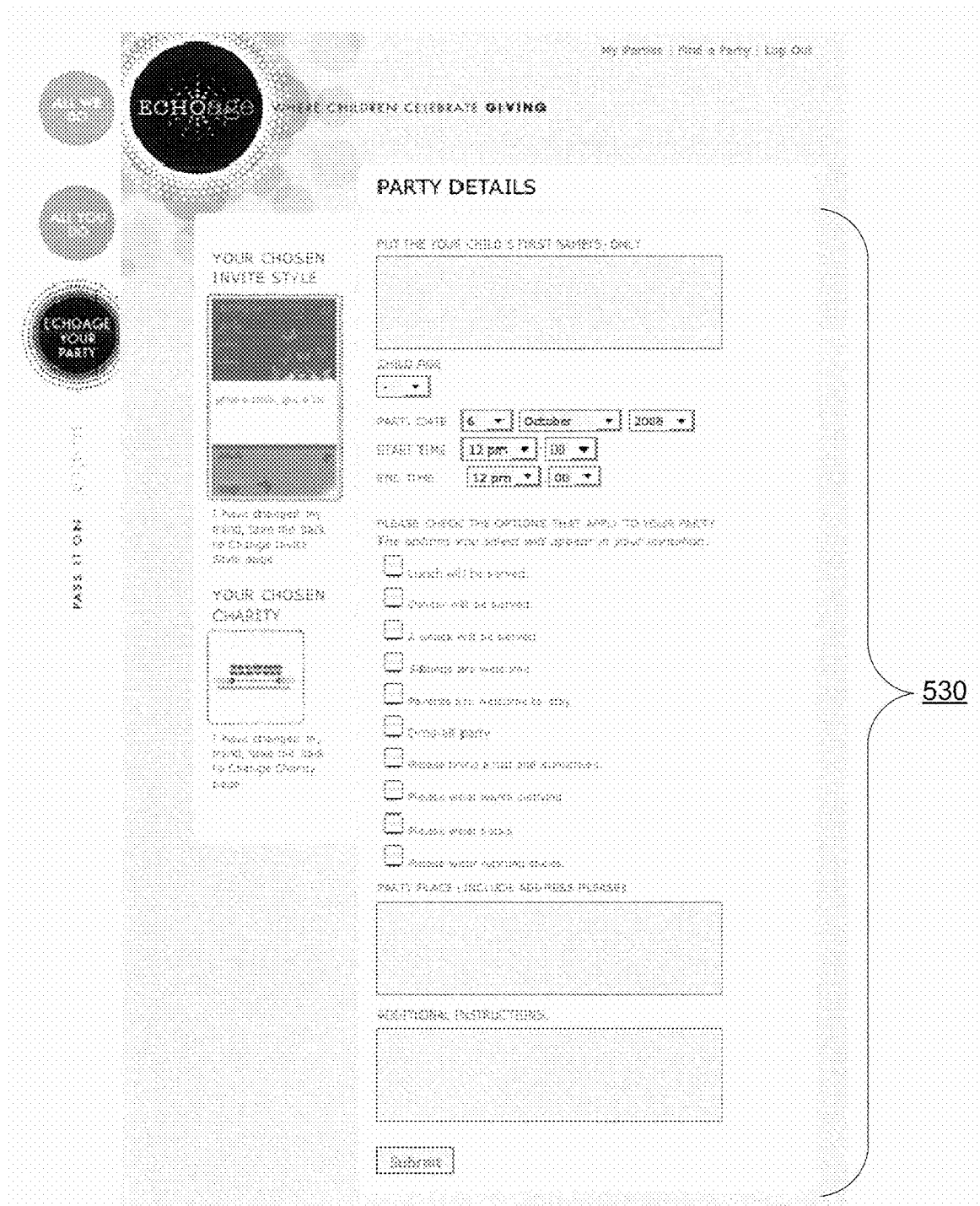
FIG. 14 shows a sample screen shot of an event webpage having event details form 530 used by event system 30 to receive event attributes.

At step 110, event system 30 registers the event by receiving event attributes. Event registration will be described in further detail in relation to FIG. 5. FIG. 14 shows a sample screen shot of an event webpage having event details form 530 used by event system 30 to receive event attributes.

At step 112, event system 30 manages the event using an event tracker. The event tracker will be described in further detail in relation to FIG. 6 and FIG. 17.

At step 114, event system 30 receives confirmation from guests for the event, where each confirmation includes a payment amount. It should be understood that the received confirmation confirms a payment amount, and is not necessarily an event confirmation (i.e. whether the guest is attending the event or not). However, this confirmation may further contain an event confirmation for the guest (accept/decline). At step 114, event system 30 may also receive notification from at least one guest, where each notification includes guest attributes. Receiving a confirmation/notification will be described in detail herein in relation to FIG. 7.

Figure 15:
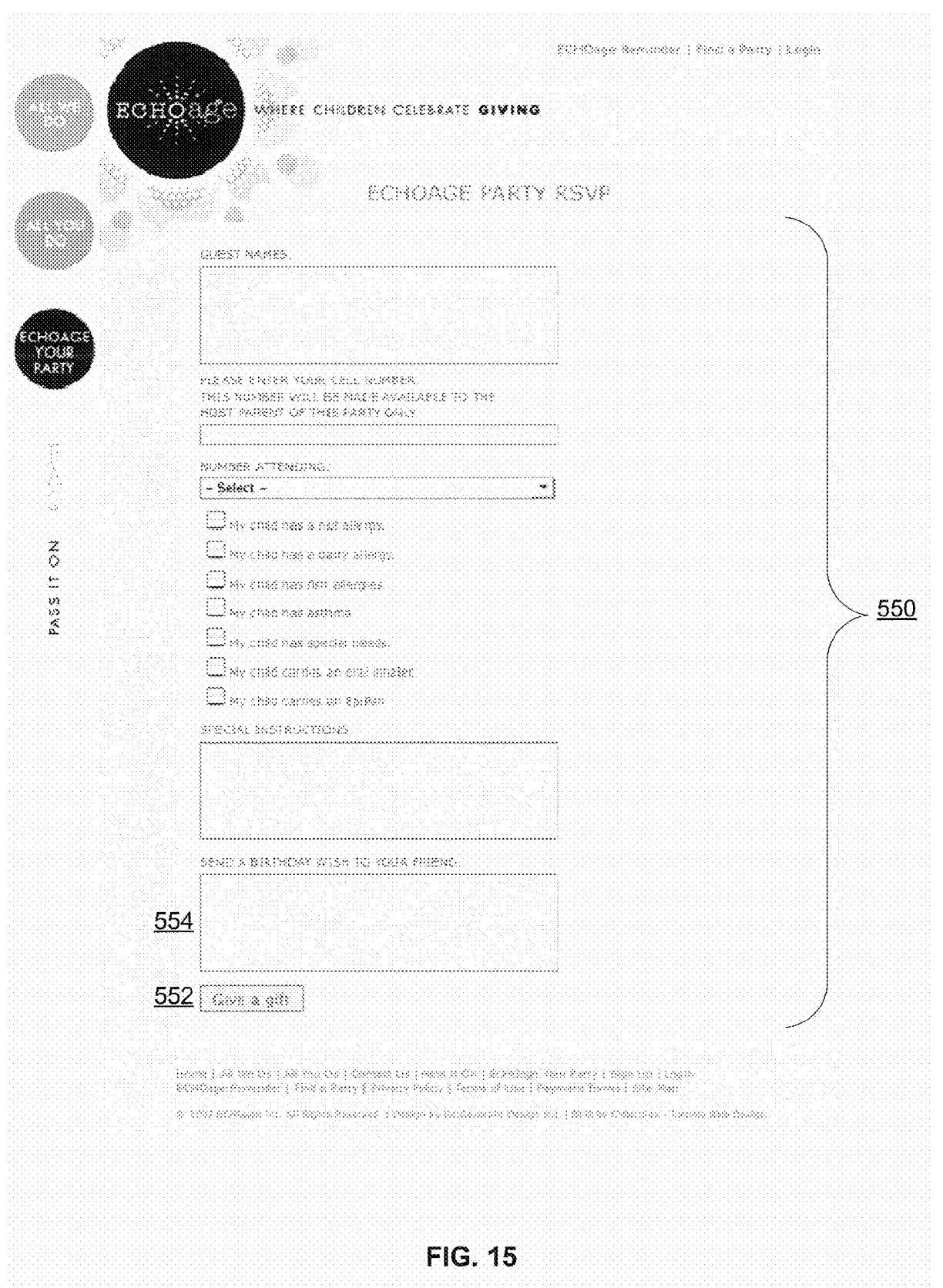

FIG. 15 shows sample screen shots of an event webpage having an RSVP form 540 and a guest details form 550, respectively, used by event system 30 to receive notifications containing guest attributes. FIG. 16 shows a sample screen shot of an event webpage having a payment details form 560 used by event system 30 and/or payment gateway 26 to receive payment confirmations.

Referring again to FIG. 4, at decision diamond 116, if event system 30 receives a notification to close the event from the host 32 using host device 24, then the method proceeds to step 118. Otherwise, the method may repeat steps 112 and/or 114.

FIG. 17 shows a sample screen shot of an event webpage with an interface 570 for receiving a notification to close the event from the host.

Upon receiving notification to close the event, event system 30 queries event module 62 for a listing of host records with host attributes indicating that the host has not received a payment. Similarly, event system 30 queries event module 62 for a listing of charities records with attributes indicating that the charity has not received a payment. Event system 30 determines which event records are linked to the unpaid host records or charities records.

Event system 30 queries guest module 66 for a listing of guest records with guest attributes indicating that they are guest of one of the events.

Referring again to FIG. 4, at step 118, event system 30 aggregates the payment amounts for all received confirmations. FIG. 17 shows a sample screen shot of an event webpage displaying the aggregated payment amounts 575 calculated by event system 30.

Event system 30 queries payments module 70 for payment records linked to each guest of an event with host or charity that has not received payment. The payment records indicate the payment amount for each guest of the event.

At step 120, event system 30 calculates a first payment total and a second payment total by dividing the aggregated payment amounts. FIG. 17 shows a sample screen shot of an event webpage displaying a first payment total 580 and a second payment total 590 calculated by event system 30.

For example, event system 30 may calculate by deducting an administration fee from the aggregated payment amounts and then by dividing the result into the first payment total and the second payment total. The administration fee may be a fixed fee or may be a percentage-based fee. For example, the percentage may be in the range of 1-30%, or more particularly 15%.

Other calculation examples are described herein in relation to payment module 70. For example, event system 30 may also charge a fixed administration fee to the host 24 for each event registered by the host 24. Event system 30 may collect received payment amounts on behalf of host in an account and may charge a hosting fee to host.

Event system 30 may calculate additional payment totals. Event system 30 may receive a selected charity (or other entity) fro guest device 24 to allow the guest to select a charity of their choice for providing payment to. Event system 30 may calculate a payment total for each selected entity, using data stored in database 16. Event system 30 may use a calculation method that attempts to reduce transaction fees associated with e.g. payment gateway 26 and reduce administration time required to distribute payment totals to host and one or more second entities.

At step 122, event system 30 distributes the first payment total to a host of the event. Event system 30 may electronically distribute the first payment total to the host of the event using payment gateway 26 by e.g., crediting an account associated with the host. Alternatively, event system 30 may manually distribute payment to the host of the event by mailing a cheque or money order for the first payment total to the host.

Payment gateway 26 may be associated with or connected to a banking system (not shown) and the first payment total may be electronically credited to an account at a financial institution associated with the host. If a banking system is used to distribute payment, the host 28 may register with event system 30 by providing host attributes that include account information. At step 122, event system 30 may connect with an electronic banking system linked to the received account information and deposit the first payment total in the host's account. In accordance with some embodiments, event system 30 may establish a partnership with a financial institution. If there is no account associated with host 28, then event system 30 may notify the partner banking system to create an account for the host and deposit the first payment total into the new account at the financial institution. Referring to the illustrative example of a child's birthday, an account may be created for the child of the host and the first payment total may be deposited into the child's account. An educational user interface may be displayed on e.g., the host device to provide information to the child regarding his/her new account, saving money, collecting interest, and the like.

At step 124, event system 30 distributes the second payment total to a second entity. Event system 30 may electronically distribute the second payment total to the second entity using payment gateway 26 or via a banking system by accessing stored account information associated with the second entity. As another example, event system 30 may manually distribute the second payment total to the second entity by mailing a cheque in the amount of the second payment total.

Event system 30 may distribute additional information regarding the event to the second entity, such as the name and address of the host 28. In some embodiments of the present invention, the second entity may be a charity and, on behalf of host 28, event system 30 coordinates the delivery of a donation for the second payment total to the charity.

If the second entity is a charity recognized by tax legislation of a relevant jurisdiction, event system 30 may facilitate the delivery of a tax-deductible charitable donation to the charity on behalf of the host 28. In accordance with some embodiments of the present invention, in response to receiving the donation, the charity may generate a tax receipt for the donation and send the tax receipt to the host 28. Alternatively, on behalf of the charity, event system 30 may generate and send a tax receipt to the host 28 for the donation distributed to the charity organization. The tax receipt may be delivered electronically to the host 28 via e-mail or manually via regular mail, for example.

Event system 30 updates event record stored in event module 62 with event attributes indicating the first payment total and the second payment total, and with event attributes indicating that event system 30 has distributed payment to the host for the event and the second entity.

When event system 30 distributes payment to the host, the event system 30 may also generate a host award and distribute the host award to the host, as described above in relation to awards module 72.

If the second entity is a charity recognized by tax legislation of a relevant jurisdiction, event system may distribute a tax receipt to the host in relation to the second payment total distributed to the charity organization.

Figure 5:
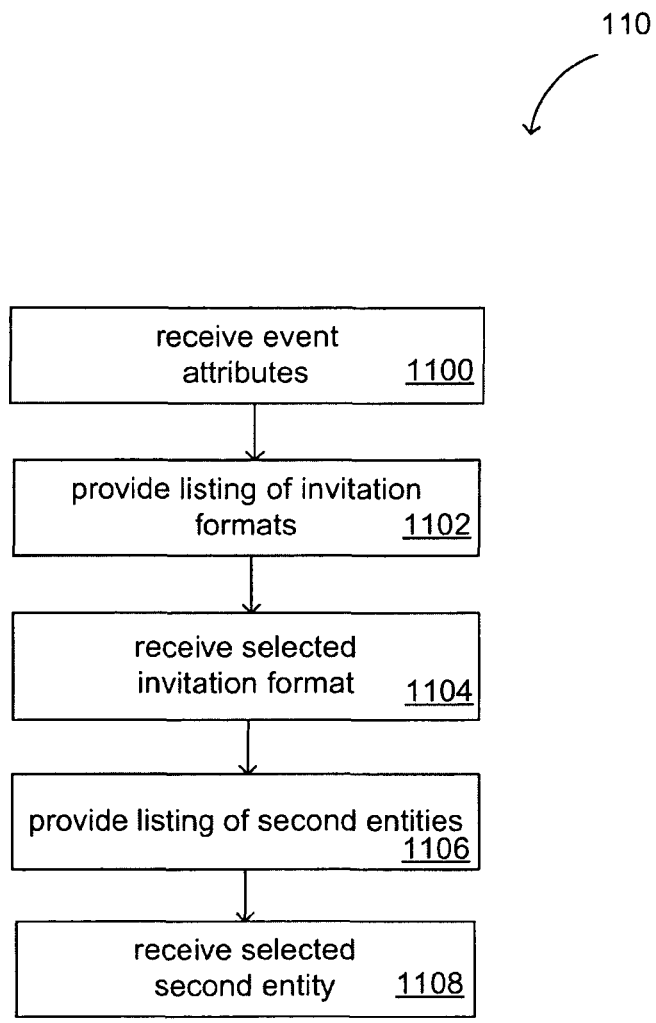
FIG. 5 is a flow diagram of a method for registering an event in accordance with at least one embodiment of the present invention.

Reference is now made to FIG. 5, which shows a flow diagram illustrating step 110 of FIG. 4 in further detail in accordance with at least one embodiment of the present invention.

At step 1100, event system 30 receives event attributes. For example, event system 30 uses web server 14 to display an event webpage on display 40, which prompts the host 28 to provide event attributes. FIG. 14 shows a sample screen shot of an event webpage having a event details form 530 used by event system 30 to receive event attributes such as: the host's 28 name, the host's 28 child's name, the host's child's age, the event date, the event start time, the event end time, location, food selections, dress code, transportation, an address, an invitation style, a charity, and any special instructions for the event, for example.

Referring again to FIG. 5, at step 1102, event system 30 provides a listing of invitation formats, each invitation format being selectable by the host. FIG. 18 shows a sample screen shot of an event webpage having a listing of invitation formats 600 for selection by the host using input device 46.

At step 1104 (FIG. 5), event system 30 receives at least one selected invitation format for use in creating invitations (electronic or otherwise). The invitation format may be specific to the guest or the event. An invitation format may be used for more than one event and many may be received for one event.

At step 1106, event system 30 provides a listing of second entities, each second entity being selectable by the host. The second entities may be charities, educational institutions, or businesses, for example. For example, event system 30 uses web server 14 to display an event webpage on display 40, which prompts the host 28 to select a second entity. FIG. 19 shows a sample screen shot of an event webpage having a listing of charities 610 for selection by host using input device 46.

At step 1108, event system 30 receives a selection of the second entity as the designated recipient of the second payment amount.

Figure 6:
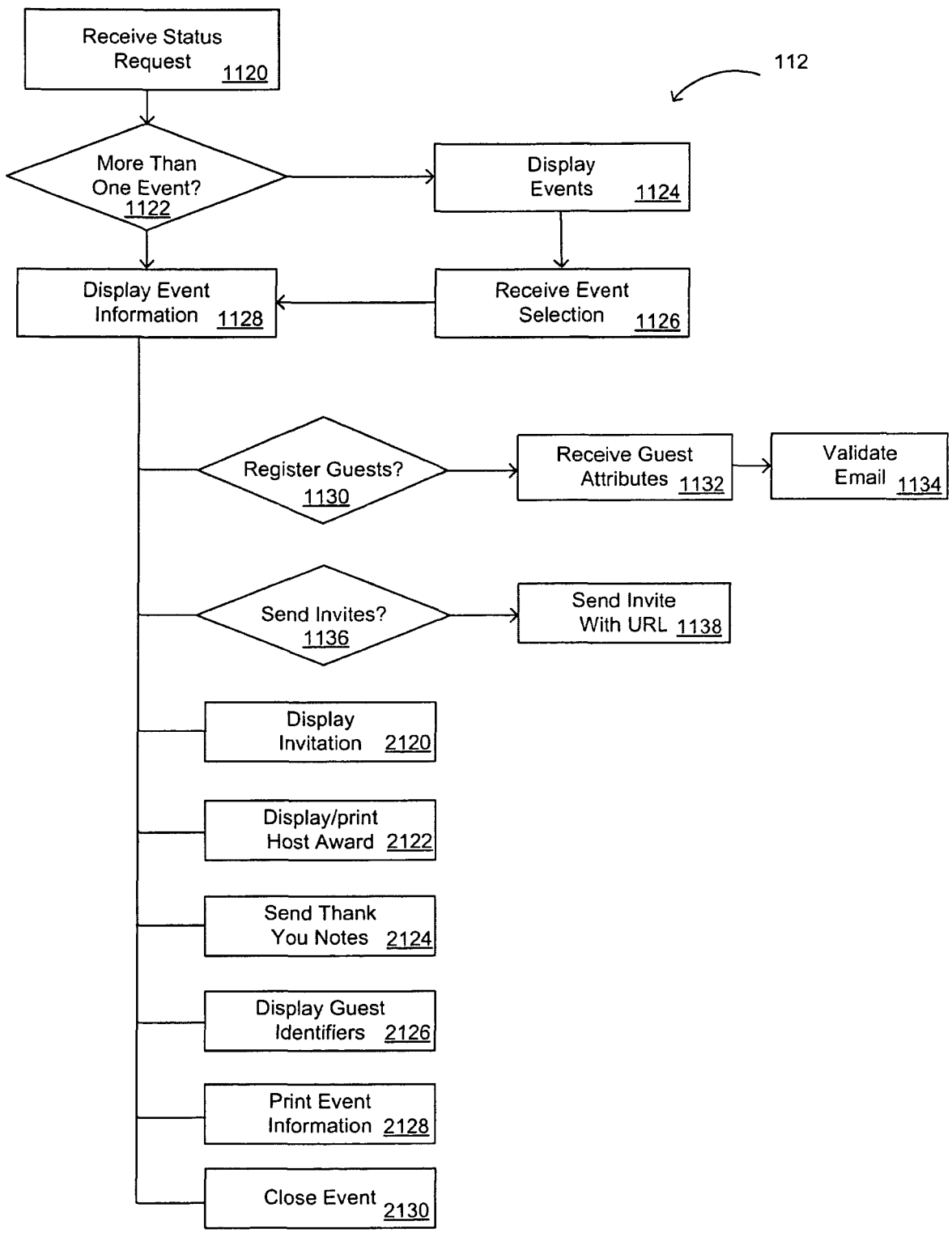
FIG. 6 is a flow diagram of a method for managing an event in accordance with at least one embodiment of the present invention.

Referring now to FIG. 6, there is shown a flow diagram illustrating in more detail step 112 of FIG. 4 in accordance with at least one embodiment of the present invention. Preferably, the steps of FIG. 6 are executed by an event tracker application. Reference will also be made to FIG. 22, which shows a sample screen shot of an event webpage and a user interface for the event tracker.

The event system 30 may provide for secure access to the event tracker. For example, the event system may only provide access to the host device 24 after registration or a successful login using confidential login attributes.

As an example overview, the event tracker may be an online tool for use by the host to manage an event, such as birthday party, and for the birthday child to learn about how payment amounts are raised, pooled and divided. The event tracker may demonstrate in real time how many guests have contributed and how much money has been raised for one gift for the birthday child and one donation for the charity organization. The event tracker may send a host of the birthday party an email notification each time a guest responds. This way the host can easily login to the event tracker and view the new total raised for charity organization and for the birthday gift. The event tracker may not display some or all of the status/event information to the guests. For example, the guests may not receive an indication of who is invited to the event and the payment amounts received from the other guests.

Referring again to FIG. 6, at step 1120, event system 30 receives a status request from host device 24. The status request may be an event registration or a host login.

At decision diamond 1122, event system 30 determines all events associated with the host 28, via e.g., a link between the host record and the event record in database server 16. In some embodiments of the present invention, event system 30 registers additional events for the host by receiving event attributes for each additional event.

If the host is associated with more than one event, the method move to step 1124, where the event system 30 provides a listing of all events for the host 28. Each event is selectable by the host. FIG. 20 shows a sample screen shot of an event webpage having a listing of all events 620 for selection by host 28 using input device 46.

At step 1126, event system 30 receives an event selection from the host.

At step 1128, event system 30 provides event and/or status information to the host for the selected event. If there is only one event associated with the host 28, then the method may proceed directly to step 1128 from decision diamond 1112.

FIG. 22 shows a sample screen shot of an event webpage having event information 595, some being selectable by host using input device 46. The event information 595 may indicate: the event, the number of guests 32, and at least some of the received guest attributes. The event information may also indicate the payment amount 585 of each received payment confirmation and a total payment amount 575 calculated by aggregating the payment amounts for all received payment confirmations. The status information 565 may indicate: new, viewed, resent, accepted and paid, accepted without paying, declined, declined and paid.

Referring again to FIG. 6, the method may move from step 1128 to any of steps 1130, 1136, 2120, 2122, 2124, 2126, and 2128, in any order. The method may also repeat these steps. These steps are optional. For example, event system 30 may provide the host with the option to carry out any of these steps, and upon receiving input from the host 28, the event system 30 carries out the corresponding method step. This allows the host 28 to effectively manage the event using event system 30.

At the optional decision diamond 1130, event system 30 provides the host with the option to register one or more guests. Even after the event system 30 has already registered one or more guests, event system 30 will continue to provide the host with the option to register an additional guest. FIG. 21 shows a sample screen shot of an interface 572, 574, and 576 registering a guest. In this example screen shot no guests have been registered for the event.

At the optional step 1132, event system 30 registers guests by receiving guest identifiers via e.g., interface 572, 574, and 576. Each guest identifier received is associated with one of the guests for the event. A guest identifier may be: name, address, email address, username, code and the like.

For example, each guest identifier may include an email address associated with one of the guests for the event. In such a case, at step 1134, event system 30 validates each email address, as will be explained in detail in relation to FIG. 10.

In further embodiments of the present invention, event system 30 may receive friend identifiers from the host for storage in database server 16, as explained herein in relation to friend module 74 (FIG. 3). Event system 30 stores the friend identifiers in database server 16 for later recall. This may occur prior to event registration and allows host device 24 to access a list of stored identifiers.

In this case, at step 1132, event system 30 may provide a listing of the friend identifiers, where each friend identifier is selectable by the host. Event system 30 receives at least one selected friend identifier as a guest identifier for guest registration.

At the optional decision diamond 1136, event system 30 provides the host 28 with the option to send invitation(s) 578 (FIG. 17) for the event to each guest.

Event system 30 allows the host to send an invitation individually to a guest or to all guests registered for the event.

The event system 30 generates invitations by querying the event module 62 for the event record. The event system also queries the invitations module 62 for the selected invitation format linked to the event record. If there is more than one event record linked to a host record, event system recalls the event selection received at step 1126 (FIG. 6).

Event system 30 queries guest module 66 for guest records, for each selected guest or for all guest records linked to the event record. The guest record includes guest identifiers, such as an email address or address.

To populate the selected invitation format, event system queries and retrieves data from the database server 16. For example, event system 30 may retrieve a guest name, host child name, the URL for the RSVP webpage, a host message, and a charity name from database server 16 for use in generating the electronic invitation.

At the optional step 1138, event system 30 sends an invitation for the event to each guest of the event using e.g., mail server 12. The invitation may be sent to the received email addresses or addresses, for example.

If in electronic form, the invitation may indicate the event associated with the guest and contain a URL to an RSVP webpage for receiving the confirmation and/or notification from the guest. The URL may be unique to a guest of the event and may be hashed for enhanced security.

For example, the URL may be hashed using the Message Digest algorithm 5 (MD5) based on a string consisting of a guest identifier unique to each guest and the number of seconds from Jan. 1, 1970 until the time the event system 30 sends the invitation.

Electronic invitations may include graphic rich HTML formatted emails with a graphic representing the invitation format and event attributes. However, some mail servers may view these graphic rich invitations as SPAM and, as a result, the electronic invitation may be blocked by a mail server at the Internet Service Provider or the email client level. This may prevent the guests 32 from receiving the electronic invitation for the event. As one alternative, the electronic invitation may be in a plain text format with no image attachments.

As another alternative, event system may receive an event request from a guest, as will be explained in detail in relation to FIG. 7 and FIG. 22.

Continuing to refer to FIG. 6, at the optional step 2120, event system 30 provides the host device 24 with the option to display an electronic invitation for the event. If event system 30 receives a selection, event system 30 displays the electronic invitation on display 40 of host device 24 using e.g., web server 14.

At the optional step 2122, event system 30 provides to the host with the option to display and/or print a host award for the event. If event system 30 receives a selection, event system 30 displays and/or prints the host award using host device 24.

Referring to the child birthday party example, the host award may acknowledge that the birthday child has done something significant to improve the world by helping a charity organization in need of funding and by helping to protect the environment. Host parents are encouraged to post the host award on the door of the party or somewhere visible at the party so that guests may see it when arriving.

At the optional step 2124, event system 30 provides the host device 24 with the option to send thank you messages to the guests 32, electronic or otherwise. If event system 30 receives a selection, event system 30 sends thank you messages to the guests 32 using the guest identifiers and/or guest attributes in database server 16.

This feature of the event system allows the host parent and his/her child to send out thank you notes to all of the guests who either attended the party or contributed online but did not attend. Each thank you note can be personalized and sent individually or the host child may write one thank you note that goes to all guests. Thank you notes are printable and collectable.

At the optional step 2126, event system 30 provides the host device 24 with the option to display guest attributes. If event system 30 receives a selection, event system 30 displays the guest attributes on display 40 of host device 24 using e.g., web server 14.

At the optional step 2128, event system 30 provides the host with the option to initiate printing of the event attributes.

At the optional step 2130, event system 30 provides the host with the option to close the event. If event system 30 receives a selection, event system 30 receives notification to close the event (FIG. 4, step 116).

If the host has registered multiple events, event system 30 manages the additional events for the host using the event tracker, as explained herein in relation to FIG. 6, step 1124. That is, event system 30 may register guests for each of the events and receives notification from guests of all the events. Event system 30 also provides event status information to the host for all events. Event system 30 provides a tool to the host 28 to efficiently manage multiple events efficiently and effectively.

Figure 7:
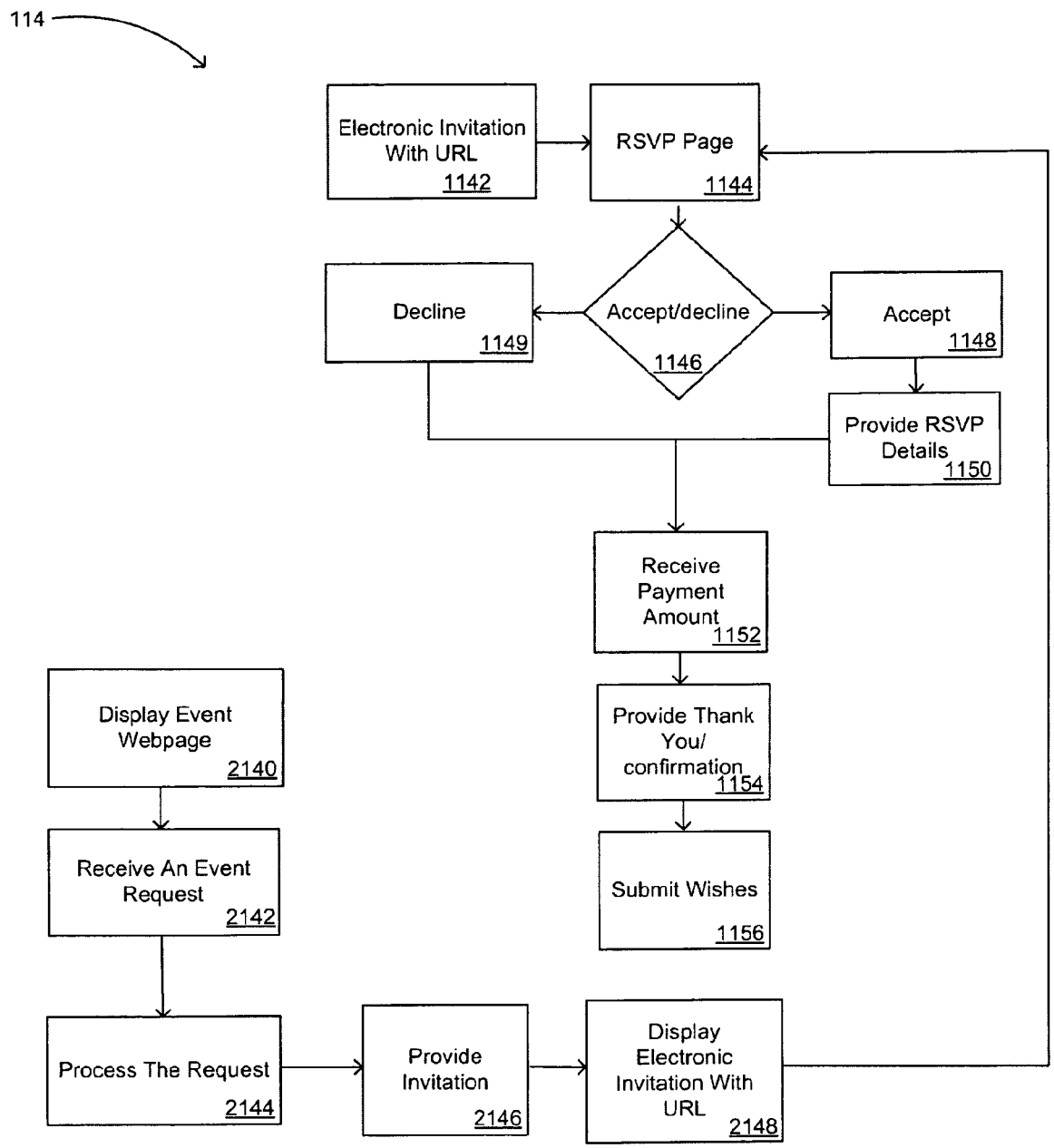
FIG. 7 is a flow diagram of a method for receiving confirmation or notification from a guest in accordance with at least one embodiment of the present invention and a method for receiving an event request from a guest in accordance with at least one embodiment of the present invention.

Referring now to FIG. 7, there is shown a flow diagram illustrating step 114 in greater detail according to an embodiment of the present invention.

At step 1142, event system provides the electronic invitation that preferably contains a URL to an RSVP webpage to guest device 22, as described above in relation to FIG. 6 step 1138. The URL may be unique to a guest of the event and may be hashed for enhanced security.

In response to the guest 32 using the guest device 22 to activate the URL, at step 1144, event system provides an RSVP webpage to guest device 22 using e.g., web server 14 and communication network 20. Event system 30 uses RSVP webpage to receive guest attributes. FIG. 14 shows sample screen shots of an RSVP webpage.

Upon loading the RSVP page on the guest device 22, event system 30 updates the guest record stored in guest module 66 with a guest attribute indicating that the guest 32 has viewed the RSVP webpage (i.e., "viewed"). The event record in the event module 62 is similarly updated.

Event system 30 sends a notification to host device 24 to give notice that the event system 30 received indication from guest device 22 that the guest 32 viewed the RSVP webpage.

To display the RSVP webpage on guest device 24 event system 30 queries the events module 62 to retrieve the event record. Using the event record, event system 30 retrieves data from the host record (via host module 60), the guest records (via guest module 66), the second entity record (via charities module 68), and the selected invitation format (via invitation module 64). The event system 30 may then send the retrieved data to guest device 24 to populate the RSVP webpage.

Continuing to refer to FIG. 7, at decision diamond 1146, event system 30 provides an option to the host to accept or decline the event invitation on the RSVP webpage.

If the invitation is accepted, at step 1148, event system 30 receives a notification that host 24 has selected the indicia for accepting the event invitation from the RSVP webpage. The event system 30 stores the acceptance data as a guest attribute in database server 16.

At step 1150, event system 30 receives guest attributes from the guest. As explained herein, FIG. 15 shows a sample screen shot of an event webpage with a guest details form 550, used by event system 30 to receive guest attributes.

The event system 30 updates the guest record stored in guest module 66 with a guest attribute indicating the acceptance data.

Event system may provide a guest with the option to submit a payment amount, as shown in FIG. 15. Upon selection, event system 30 prompts guest for payment attributes by e.g., displaying an event webpage containing a payment details form 560, as shown in FIG. 16.

Referring again to FIG. 7, at step 1152, event system 30 receives electronic payment information from guest device 22. Alternatively, event system 30 may direct guest device 22 to payment gateway 26 to receive electronic payment information.

Event system 30 receives a confirmation indicating a payment amount. The event system 30 updates the payment module 70 with a payment record indicating the payment amount. Event system 30 may similarly update the following records with a guest attribute indicating the payment amount: the events record stored in event module 62, guest record stored in guest module 66, charities record in the charities module 68.

In some embodiments, event system 30 generates an award and sends the award to the guest. The event system 30 may send an email confirmation to the host device 24 indicating the received payment amount. The email confirmation may also contain an URL or location identifier indicating the location of a host award.

At step 1154, event system provides a confirmation page to the guest device 22.

At step 1156, event system receives event wishes preferably as text data from the guest device 22. FIG. 15 shows a sample screen shot of an RSVP page with a guest details form 550 containing a text box 554 for receiving event wishes.

If at decision diamond 1146 the invitation is declined, the logic proceeds to step 1149, and event system 30 receives a notification that the host 24 has selected the indicia for declining the event invitation from the RSVP webpage. The event system 30 stores the data as a guest attribute in database server 16. In some embodiments of the present invention, the logic flow from step 1148 or 1149 may proceed to step 1152, where the event system 30 receive a payment confirmation even when the guest has declined the event invitation.

In some embodiments of the present invention, a guest 32 accesses event webpage directly using guest device 22 via e.g., a publicly known URL. This function may be useful if a guest has lost his/her invitation or has not received an electronic invitation with URL for RSVP webpage. As an example, a guest may provide their email address to event system 30 and event system 30 sends the guest a new invitation that is active and can be used to RSVP, submit guest attributes, and submit a payment confirmation.

In this case, at step 2140, event system 30 provides event application 80 to guest device 22 by e.g., displaying an event webpage served using the web server 14. FIG. 22 shows a sample screen shot of an event webpage provided to guest device 22 by web server 14, for use by event system 30 to receive event request.

Referring again to FIG. 7, at step 2142, event system 30 receives an event request from a guest via e.g., communication network 20, where the request comprises a guest identifier. The guest identifier may be an email address associated with the guest.

At step 2144, event system 30 processes the event request using the guest identifier to identify the event associated with the guest. The guest identifier may be stored in the database server 16 and linked to an event record via e.g., a guest record. The event system may have received the guest identifier previously from host device 24 (e.g., FIG. 6, step 1132).

At step 2146, event system 30 provides an invitation for the identified event to the guest using the guest identifier. For example, the event system 30 may use the guest identifier to provide an electronic invitation to guest device 22 over communication network 20 using, e.g. mail server 12. The electronic invitation may contain a URL to an RSVP webpage. The URL may be unique to a guest of the event and may be hashed for enhanced security.

At step 2148, the guest device 22 receives the electronic invitation that contains a URL to an RSVP webpage. The electronic invitation may be displayed on the guest device 22, and upon activation of the URL, the method proceeds to step 1144.

Figure 8:
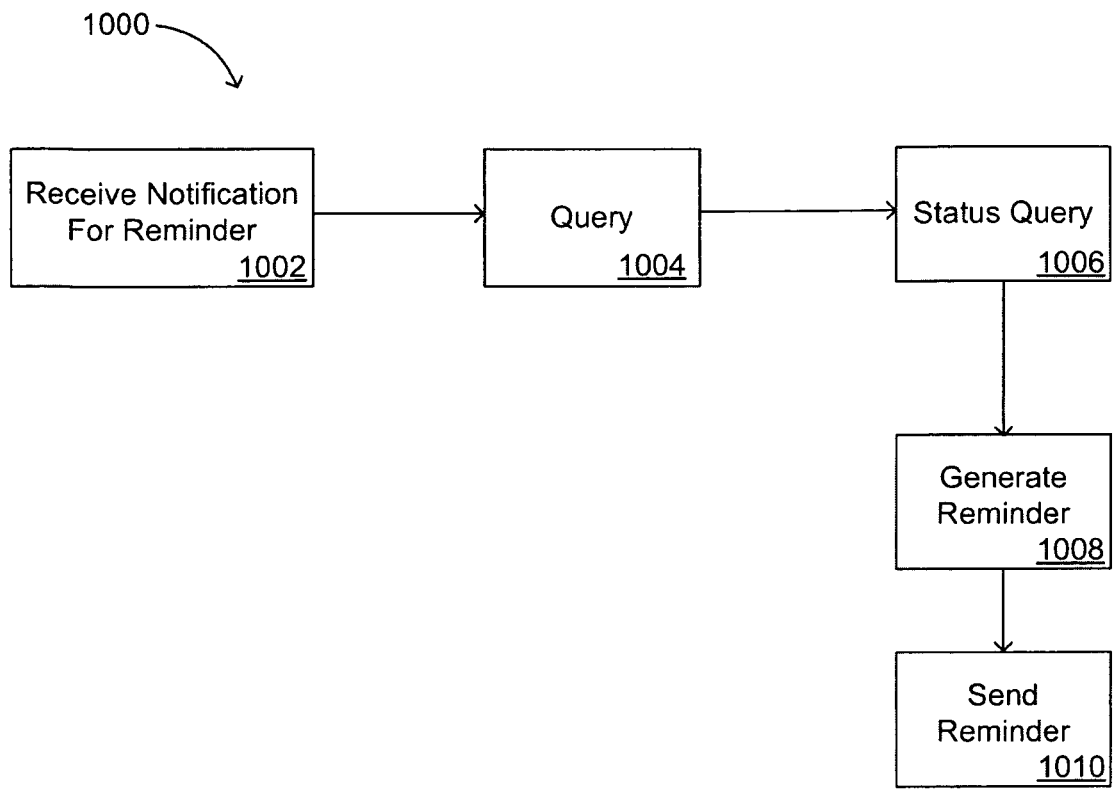
FIG. 8 is a data flow diagram of a method for sending a reminder to guests in accordance with at least one embodiment of the present invention.

Referring now to FIG. 8, there is shown a data flow diagram of a method 1000 for sending a reminder to guests in accordance with at least one embodiment of the present invention.

At step 1002, event system 30 receives notification to determine whether an electronic reminder should be sent to guests or host(s). Possible electronic reminders include: remind guest to attend event, remind guest to RSVP for event, remind host to close event, and remind host to send electronic thank you messages.

For example, event system 30 may send an electronic reminder to guests if they have not RSVPed one week prior to the event date. Three days prior to the event date, event system 30 may send every guest who has responded "yes" a reminder to attend the event and some event attributes.

At step 1004, event system 30 queries the events module 62 for event records that have an event attribute that corresponds to a time relevant to the reminder.

At step 1006, event system 30 queries guests module 66 for guest records that have a guest attribute that is relevant to the reminder (i.e. attendance).

At step 1008, event system 30 loops through all retrieved event records and guest records and generates an electronic reminder for guests and/or host(s) using data stored in database server 16.

At step 1010, event system 30 sends an electronic reminder to all guests and/or host(s) using e.g., mail server 12.

In some embodiments of the present invention, event system may provide the host with an option to send a reminder for the event using e.g., web server 14. In response to receiving a selection for sending a reminder for the event, event system 30 determines which guests a notification has not been received from. Event system 30 generates and sends an electronic reminder for the event to the determined guests, using e.g., mail server 12.

Figure 9:
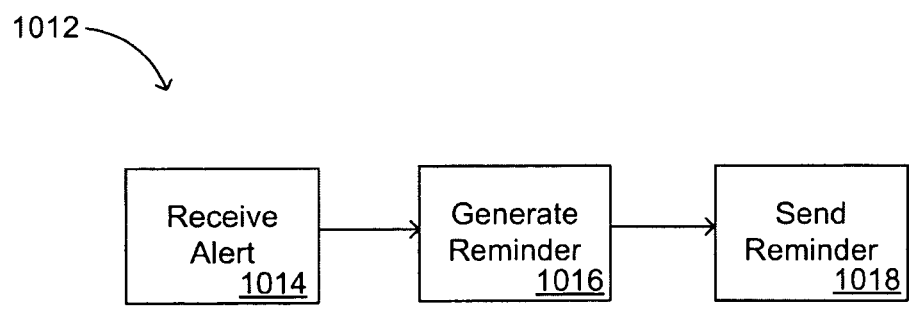
FIG. 9 is a data flow diagram of a method for sending a reminder to a subscriber in accordance with at least one embodiment of the present invention.

Referring now to FIG. 9, there is shown a data flow diagram of a method 1012 for sending a reminder to a subscriber using the subscriber module 76 in accordance with at least one embodiment of the present invention.

As described above in relation to subscriber module 76, event system 30 may receive one or more subscriber identifiers and stores a subscriber record containing the subscriber identifiers in the database server 16. This allows a subscriber to "save the date" for an event and receive an electronic notification reminder for the event. FIG. 23 shows a sample screen shot of a subscriber form 700 used by event system 30 to receive subscriber identifiers.

At step 1014, event system 30 receives an alert or notification to determine whether an electronic notification should be sent to a subscriber. Event system 30 may be programmed to receive this notification based on a predetermined time or on a recurring basis, for example. Event system 30 retrieves all subscriber records containing a subscriber identifier relevant to a time/date from the alert from subscriber module 76. The subscriber identifier may be the subscriber's name, email address, address, child's name, or date of birth, for example.

At step 1016, event system 30 loops through all retrieved subscriber records and generates an electronic reminder using the retrieved subscriber records and other data stored in database server 16.

At step 1018, the event system sends the electronic reminder to all subscribers associated with the retrieved subscriber records. The electronic notification notifies the subscriber to register an event so that the subscriber becomes the host 28.

Figure 10:
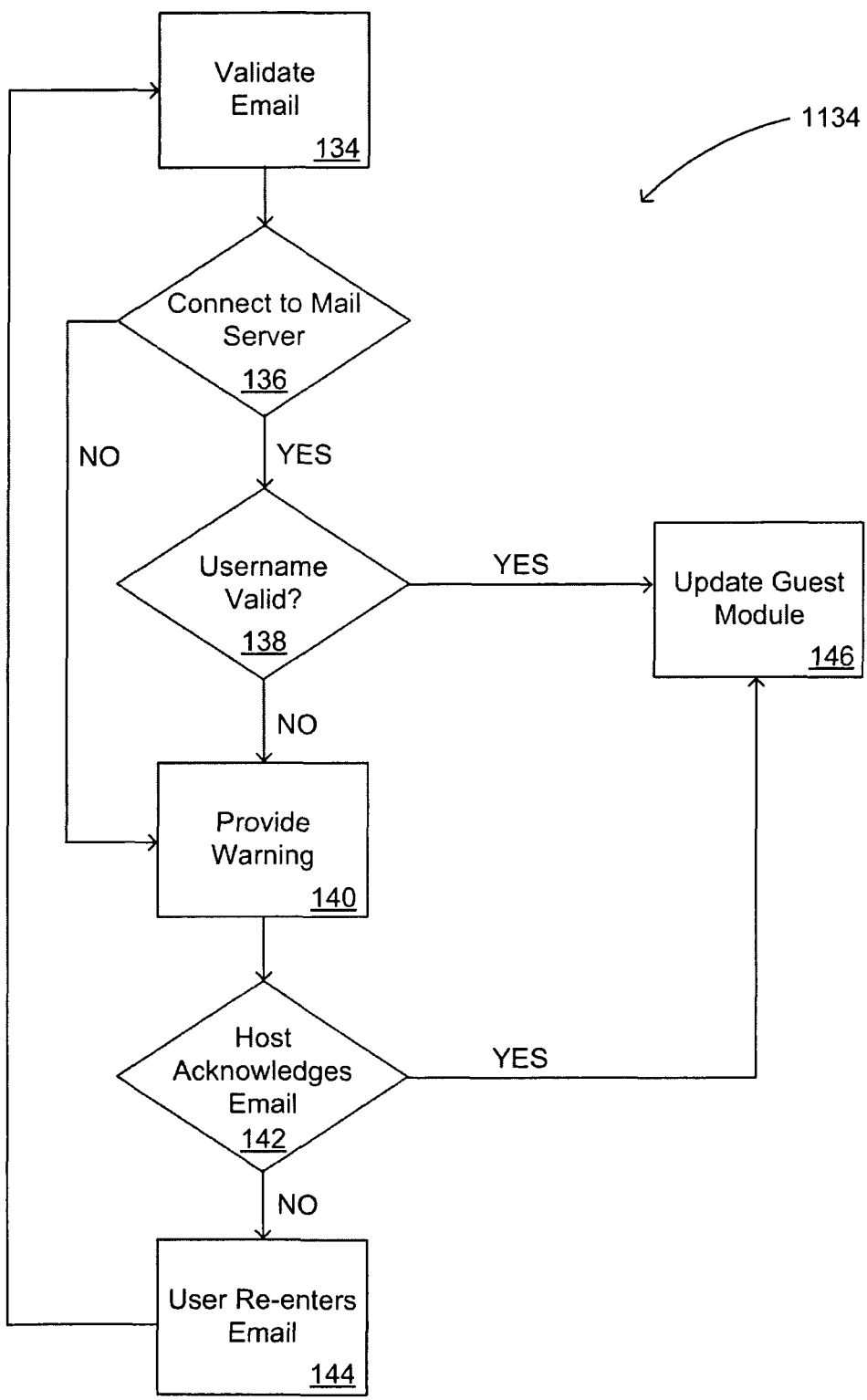
FIG. 10 is a data flow diagram of a method for validating an email address of a guest in accordance with at least one embodiment of the present invention.

Referring now to FIG. 10, there is shown a data flow diagram illustrating in greater detail step 1134 (shown in FIG. 6) according to an embodiment of the present invention. An email address may be validated to ensure that it is correct so that it may be used to send an electronic invitation or notification to the guest associated with the email address. If the email address is not correct then the guest may not receive the electronic invitation or notification. Event system may have received an incorrect email from host device 24 as the host may have made an input error.

At step 134, event system 30 is prompted to validate an email address, when receiving the email address as a guest identifier, for example. Event system determines whether the email address is of a proper email address format, where an example email format is; username@domain.extension.

At decision diamond 136, event system 30 attempts to connect to a mail server (not shown) linked to the email address via the domain and extension of the email address.

If the event system is not successful in the attempt to connect, method 1134 proceeds to step 140.

If the event system 30 is successful in the attempt to connect, at decision diamond 138, event system 30 queries the mail server (not shown) to determine if the username of the email address is valid.

If the username is valid, then event system 30 identifies the email address as valid and, at step 146, event system 30 updates the guest record of the guest module 66 with a guest attribute indicating the email address.

If the username is not valid, the method 1134 proceeds to step 140.

At step 140, event system 30 provides a warning message to host device 24 to check email address.

At decision diamond 142, event system provides the host device 24 with the option to confirm that the email address is correct and for confirming that the email address is not correct and needs to be corrected.

In response to receiving a selection from the host confirming that the email address is correct, the method moves to step 146, and event system 30 updates the guest record of the guest module 66 with a guest attribute indicating the email address.

If the email address is not correct, at step 144, event system 30 prompts host device 24 for a new email address and receives the new email address from host device 24. The method 1134 then returns to step 134 to validate the newly received email address.

Event system 30 may provide a forum application that gives hosts a venue to discuss their events, successes, new ideas, how to achieve buy in from guests, ideas for gifts, ideas for guests, ideas for charities and other second entities. The forum application may be allow administrators of the system to generate user input and feedback about the service.

The present invention has been described with regard to preferred embodiments. However, it will be obvious to persons skilled in the art that a number of variants and modifications can be made without departing from the scope of the invention as described herein.

The invention claimed is:

1. A method for distributing payment to a host of an event and a charitable organization, the method comprising:

registering the host by receiving a plurality of host attributes and storing the host attributes in a host record, wherein the host attributes comprise host account information and an indication that the host has not received payment;

registering the event by receiving a plurality of event attributes and storing the event attributes in an event record linked to the host record, wherein registering the event further comprises providing a listing of a plurality of charitable organizations each charitable organization being selectable by the host, and receiving a selected charitable organization, wherein the selected charitable organization is associated with a charity record storing charity attributes, wherein the charity attributes comprise charity account information and an indication that the charity has not received payment, wherein the charity record is linked to the event record;

sending, by a computer processor, an electronic invitation for an event to each of a plurality of guests in communication with the computer processor by a network, wherein each guest is associated with a guest record storing guest attributes, wherein the guest attributes comprise a guest identifier, wherein each guest record is linked to the event record, wherein each electronic invitation comprises a payment request for the event, an attendance request for the event, and a uniform resource locator for a network resource configured to receive a confirmation for the attendance request and the payment request, wherein the uniform resource locator is unique to the respective guest and is generated using the guest identifier associated with the guest;

providing an indication that a predetermined percentage of an actual payment total for the event will be used to calculate a host payment total and a charity payment total, wherein the actual payment total is an aggregate of all received payments for the event, wherein the host payment total will be distributed to the host of the event and the charity payment total will be distributed to the charitable organization;

after the indication step, receiving a plurality of confirmations from at least a portion of the guests, wherein each confirmation comprises an indication of attendance for the event in response to the attendance request, an actual payment amount in response to the payment request, and wherein each confirmation is received from a corresponding one of the portion of the guests through the network resource;

storing each of the actual payment amounts as a payment record linked to the guest record of the corresponding guest;

receiving a notification to close the event from the host;

determining that the host has not received payment for the event using the indication that the host has not received payment of the host record;

determining that the selected charitable organization has not received payment for the event using the indication that the charity has not received payment of the charity record;

querying for the event record linked to the host record and the charity record;

determining the guest records linked to the event record;

determining the payment records linked to the determined guest records;

aggregating the actual payment amounts of all of the determined payment records to calculate the actual payment total for the event;

calculating, by the computer processor, the host payment total and the charity payment total by dividing the actual payment total for the event according to the predetermined percentage;

distributing the host payment total to the host of the event using the host account information of the host record; and distributing the charity payment total to the selected charitable organization using the charity account information of the charity record.

2. The method of claim 1 wherein registering the event further comprises:

providing a listing of a plurality of electronic invitation formats, each electronic invitation format being selectable by the host; and receiving at least one selected electronic invitation format for use in creating a plurality of electronic invitations.

3. The method of claim 1 further comprising:

registering the plurality of guests for the event by receiving the guest identifiers, each guest identifier being associated with one of the plurality of guests for the event.

4. The method of claim 3 wherein each guest identifier comprises an email address.

5. The method of claim 4 further comprising validating each email address.

6. The method of claim 1 further comprising:

receiving electronic payment from one or more of the plurality of guests.

7. The method of claim 3 wherein receiving confirmation comprises:

receiving a plurality of guest attributes from each guest of the plurality of guests.

8. The method of claim 1 further comprising:

receiving an event request from one guest of the plurality of guests, wherein the event request comprises a guest identifier;

processing the event request using the guest identifier to identify the event associated with the guest; and sending a new electronic invitation to the guest, wherein the invitation comprises the attendance request, the payment request and the uniform resource locator for the network resource configured to receive the confirmation.

9. The method of claim 1 further comprising:
distributing a tax receipt to the host in relation to the second payment total distributed to the charity organization.

10. The method of claim 1 wherein dividing the actual payment total for the event comprises deducting an administration fee from the actual payment total for the event prior to dividing into the host payment total and the charity payment total.

11. The method of claim 1 further comprising:
creating the plurality of electronic invitations for the event by querying for all guest records linked to the event record; and
sending the electronic invitations to the guests using the guest identifiers of the guest records linked to the event record.

12. The method of claim 11 further comprising, for each received confirmation from the guest device, querying for the guest record associated with the guest device and storing an indication of the confirmation and the corresponding payment amount in the guest record.

13. The method of claim 1 wherein the predetermined percentage is 50% of the actual payment total for the event after deducting a service fee.

14. The method of claim 1 further comprising hashing the uniform resource locator.

15. The method of claim 11 further comprising:
receiving a notification that a guest device corresponding to a guest has displayed the network resource configured to receive the confirmation;
querying for the guest record associated with the guest and storing an indication of the notification in the guest record.

16. The method of claim 1 wherein the guest identifier comprises an email address associated with the guest.

17. The method of claim 1 wherein the network resource is a webpage.

18. A system for distributing payment to a host of an event and a charitable organization, the system comprising:
a memory; and
a processor configured to perform the following steps:
register the host by receiving a plurality of host attributes and store the host attributes in a host record, wherein the host attributes comprise host account information and an indication that the host has not received payment;
register the event by receiving a plurality of event attributes and store the event attributes in an event record linked to the host record;
provide a listing of charitable organizations, each charitable organization being selectable by the host, and receive a selected charitable organization, wherein the selected charitable organization is associated with a charity record storing charity attributes, wherein the charity attributes comprise charity account information and an indication that the charity has not received payment, wherein the charity record is linked to the event record;
associate each guest of a plurality of guests for the event hosted by the host with a guest record storing guest attributes comprising a guest identifier, wherein each guest record is linked to the event record;
send an electronic invitation for the event to each of a plurality of guests in communication with the processor by a network, wherein each electronic invitation comprises a payment request for the event, an attendance request for the event, and a uniform resource locator for a network resource configured to receive a confirmation for the attendance request and the payment request, wherein the uniform resource locator is unique to the respective guest and is generated using the guest identifier associated with the guest;
provide an indication that a predetermined percentage of an actual payment total for the event will be used to calculate a host payment total and a charity payment total, wherein the actual payment total is an aggregate of all received payments for the event, wherein the host payment total will be distributed to the host of the event and the charity payment total will be distributed to the charitable organization;
after the step of providing the indication, receive a plurality of confirmations from at least a portion of the guests, wherein each confirmation comprises an indication of attendance for the event in response to the attendance request, an actual payment amount in response to the payment request, and wherein each confirmation is received from a corresponding one of the portion of the guests through the network resource; and
store each of the actual payment amounts as a payment record linked to the guest record of the corresponding guest;
receive a notification to close the event from the host;
determine that the host has not received payment for the event using the indication that the host has not received payment of the host record;
determine that the selected charitable organization has not received payment for the event using the indication that the charity has not received payment of the charity record querying for the event record linked to the host record and the charity record;
determine the guest records linked to the event record;
determine the payment records linked to the determined guest records;
aggregate the actual payment amounts of all of the determined payment records to calculate the actual payment total for the event;
calculate the host payment total and the charity payment total by dividing the actual payment total for the event according to the predetermined percentage; and
distribute the host payment total to the host of the event using the host account information of the host record and the charity payment total to the selected charitable organization using the charity account information of the charity record.

19. The system of claim 18
wherein the processor is further configured to provide a listing of a plurality of electronic invitation formats, each electronic invitation format being selectable by the host, and receive at least one selected electronic invitation format for use in creating a plurality of electronic invitations.

20. The system of claim 18 wherein the processor is further configured to register guests for the event by receiving guest identifiers, each guest identifier being associated with one of the plurality of guest for the event, and store a guest record in a database for each received guest identifier.

21. The system of claim 20 wherein each guest identifier comprises an email address associated with the guest.

22. The system of claim 21 wherein the processor is further configured to validate each email address.

23. The system of claim 18 wherein the processor is further configured to receive electronic payment from one or more of the plurality of guests using a payment gateway.

24. The system of claim 18 wherein the processor is further configured to deduct an administration fee from the actual payment total for the event prior to dividing into the host payment total and the charity payment total.

25. The system of claim 18 wherein the network resource is a webpage.

26. A non-transitory computer readable medium including computer executable instructions which, when executed on a computing device, cause the computing device to perform the steps of:

registering the host by receiving a plurality of host attributes and storing the host attributes in a host record, wherein the host attributes comprise host account information and an indication that the host has not received payment;

registering the event by receiving a plurality of event attributes and storing the event attributes in an event record linked to the host record, wherein registering the event further comprises providing a listing of a plurality of charitable organizations each charitable organization being selectable by the host, and receiving a selected charitable organization, wherein the selected charitable organization is associated with a charity record storing charity attributes, wherein the charity attributes comprise charity account information and an indication that the charity has not received payment, wherein the charity record is linked to the event record sending, by a computer processor, an electronic invitation for an event to each of a plurality of guests in communication with the computer processor by a network, wherein each guest is associated with a guest record storing guest attributes, wherein the guest attributes comprise a guest identifier, wherein each guest record is linked to the event record, wherein each electronic invitation comprises a payment request for the event, an attendance request for the event, and a uniform resource locator for a network resource configured to receive a confirmation for the attendance request and the payment request, wherein the uniform resource locator is unique to the respective guest and is generated using the guest identifier associated with the guest;

providing an indication that a predetermined percentage of an actual payment total for the event will be used to calculate a host payment total and a charity payment total, wherein the actual payment total is an aggregate of all received payments for the event, wherein the host payment total will be distributed to the host of the event and the charity payment total will be distributed to the charitable organization;

after providing the indication step, receiving a plurality of confirmations from at least a portion of the guests, wherein each confirmation comprises an indication of attendance for the event in response to the attendance request, an actual payment amount in response to the payment request, and wherein each confirmation is received from a corresponding one of the portion of the guests through the network resource;

storing each of the actual payment amounts as a payment record linked to the guest record of the corresponding guest;

receiving a notification, to close the event from the host;

determining that the host has not received payment for the event using the indication that the host has not received payment of the host record;

determining that the selected charitable organization has not received payment for the event using the indication that the charity has not received payment of the charity record;

querying for the event record linked to the host record and the charity record;

determining the guest records linked to the event record;

determining the payment records linked to the determined guest record;

aggregating the actual payment amounts of all of the determined payment records to calculate the actual payment total for the event;

calculating, by the computer processor, the host payment total and the charity payment total by dividing the actual payment total for the event according to the predetermined percentage;

distributing the host payment total to the host of the event using the host account information of the host record; and distributing the charity payment total to the selected charitable organization using the charity account information of the charity record.

* * * * *